US012293888B2

(12) United States Patent
Morelli et al.

(10) Patent No.: US 12,293,888 B2

(45) Date of Patent: May 6, 2025

(54) MEDIUM VOLTAGE SWITCHING APPARATUS

(71) Applicant: ABB Schweiz AG, Baden (CH)

(72) Inventors: Emanuele Morelli, Azzano San Paolo (IT); Gianluca Cortinovis, Albino (IT); Giorgio Forlani, Romano di Lombardia (IT); Jacopo Bruni, Caselle Lurani (IT); Pierluigi Invernizzi, Corna Imagna (IT); Dietmar Gentsch, Ratingen (DE)

(73) Assignee: ABB Schweiz AG, Baden (CH)

( * ) Notice: Subject to any disclaimer, the term of this patent is extended or adjusted under 35 U.S.C. 154(b) by 203 days.

(21) Appl. No.: 18/306,473

(22) Filed: Apr. 25, 2023

(65) Prior Publication Data

US 2023/0368992 A1 Nov. 16, 2023

(30) Foreign Application Priority Data

May 12, 2022 (EP) .................................... 22173028

(51) Int. Cl.

*H01H 33/662* (2006.01)
*H01H 33/28* (2006.01)
*H01H 33/66* (2006.01)

(52) U.S. Cl.

CPC .......... *H01H 33/662* (2013.01); *H01H 33/28* (2013.01); *H01H 33/6606* (2013.01)

(58) Field of Classification Search

CPC .. H01H 33/662; H01H 33/28; H01H 33/6606; H01H 33/6661; H01H 33/666;

(Continued)

(56) References Cited

U.S. PATENT DOCUMENTS 2,480,622 A 8/1949 Warnock
2,773,154 A * 12/1956 Williams ............ H01H 33/126 200/558

(Continued)

FOREIGN PATENT DOCUMENTS

DE 69516461 T2 10/2000
DE 69517740 T2 2/2001

(Continued)

OTHER PUBLICATIONS

Extended European Search Report for European Application No. 22173028.6, dated Oct. 17, 2022, 4 pages.

(Continued)

*Primary Examiner* — William A Bolton

(74) *Attorney, Agent, or Firm* — McCarter & English, LLP

(57) ABSTRACT

A switching apparatus including one or more electric poles. For each electric pole, the switching apparatus includes a first pole terminal, a second pole terminal, a ground terminal, and a plurality of fixed contacts spaced apart one from another. For each electric pole, the switching apparatus further includes a movable contact and a vacuum interrupter. The movable contact is reversibly movable about a corresponding rotation axis. The vacuum interrupter includes a movable arc contact reversibly movable along a corresponding translation axis. For each electric pole, the switching apparatus further includes a motion transmission mechanism operatively coupled to a contact shaft solidly coupled to the movable arc contact. The motion transmission mechanism is actuatable by the movable contact to cause a movement of said movable arc contact along said translation axis, when said movable contact moves about said rotation axis.

17 Claims, 18 Drawing Sheets

(58) Field of Classification Search
CPC ......... H01H 33/664; H01H 2033/6667; H01H 31/003; H01H 31/28
USPC .......................................... 218/139, 134, 140
See application file for complete search history.

(56) References Cited

U.S. PATENT DOCUMENTS

| | | | | |
|---|---|---|---|---|
| 3,671,696 | A * | 6/1972 | Brunner | H01H 33/12 218/8 |
| 3,824,359 | A * | 7/1974 | Date | H01H 33/127 218/10 |
| 6,624,996 | B2 * | 9/2003 | Theaudiere | H01H 9/104 361/104 |
| 8,581,135 | B2 * | 11/2013 | Piccoz | H01H 33/126 218/120 |
| 9,058,948 | B2 * | 6/2015 | Grosjean | H01H 33/126 |
| 9,679,724 | B2 * | 6/2017 | Abrahamsen | H01H 33/128 |
| 2013/0187733 | A1 * | 7/2013 | Bullock | H01H 33/6662 335/13 |
| 2017/0301491 | A1 | 10/2017 | Zhang | |

FOREIGN PATENT DOCUMENTS

| | | | |
|---|---|---|---|
| DE | 202010009448 | U1 | 9/2010 |
| EP | 0680063 | A1 | 11/1995 |
| EP | 0693763 | A1 | 1/1996 |
| EP | 2182536 | A1 | 5/2010 |
| EP | 2845213 | A1 | 3/2015 |
| EP | 3929955 | A1 | 12/2021 |
| WO | 2006074975 | A1 | 7/2006 |
| WO | 2014001029 | A1 | 1/2014 |
| WO | 2020200864 | A1 | 10/2020 |

OTHER PUBLICATIONS

International Search Report for International Application No. PCT/EP2020/057928, dated Jun. 6, 2020, 4 pages.

European Search Report for European Application No. EP21382562, dated Oct. 29, 2021, 3 pages.

International Search Report for International Application No. PCT/EP2013/061437, dated Aug. 8, 2013, 4 pages.

* cited by examiner $P_A$, $C_1$, $P_3$, closed state $P_A$, $C_1$, $P_3$, closed state $P_B$, $C_2$, $P_4$, open state $P_C$, $C_2$, $P_4$, grounded state

MEDIUM VOLTAGE SWITCHING APPARATUS

CROSS-REFERENCE TO RELATED APPLICATION

This application claims priority to European Patent Application No. 22173028.6, filed May 12, 2022, and titled "A MEDIUM VOLTAGE SWITCHING APPARATUS", which is hereby incorporated by reference in its entirety.

BACKGROUND

The present disclosure relates to a switching apparatus for medium voltage electric systems, more particularly to a load-break switch for medium voltage electric systems.

Load-break switches are well known in the state of the art.

These switching apparatuses, which are generally used in secondary distribution electric grids, are capable of providing circuit-breaking functionalities (namely breaking and making a current) under specified circuit conditions (typically nominal or overload conditions) as well as providing circuit-disconnecting functionalities (namely grounding a load-side section of an electric circuit).

Most traditional load-break switches of the state of the art have their electric poles immersed in a sulphur hexafluoride ($SF_6$) atmosphere as this insulating gas ensures excellent performances in terms of dielectric insulation between live parts and arc-quenching capabilities when currents are interrupted.

As is known, however, $SF_6$ is a powerful greenhouse gas and its usage is subject to severe restriction measurements for environmental preservation purposes. For this reason, over the years, there has been made a considerable effort to develop and design load-break switches not employing $SF_6$ as an insulating gas.

Some load-break switches have been developed, in which electric poles are immersed in pressurized dry air or an environment-friendly insulation gas, such as a mixture of oxygen, nitrogen, carbon dioxide and/or a fluorinated gas. Unfortunately, the experience has shown that these switching apparatuses generally do not show fully satisfactory performances, particularly in terms of arc-quenching capabilities.

Other currently available load-break switches employ, for each electric pole, different contact arrangements electrically connected in parallel between the pole terminals.

A contact arrangement has electric contacts operating in an atmosphere filled with an environment-friendly insulating gas or air and it is designed for carrying most of the current flowing along the electric pole as well as driving possible switching maneuvers.

Another contact arrangement, instead, has electric contacts operating in a vacuum atmosphere and it is specifically designed for quenching the electric arcs arising when the current flowing along the electric pole is interrupted.

These switching apparatuses have proven to ensure a relatively low environmental impact while providing, at the same time, high-level performances in terms of dielectric insulation and arc-quenching capabilities. However, until now, they adopt complicated solutions to manage and coordinate the operation of the above-mentioned multiple contact arrangements. Therefore, they still offer poor performances in terms of structural compactness and reliability in operation.

BRIEF DESCRIPTION

The present disclosure provides a switching apparatus for medium voltage (MV) electric systems that allows solving or mitigating the above-mentioned technical problems.

More particularly, the present disclosure provides a switching apparatus ensuring high-level performances in terms of dielectric insulation and arc-quenching capabilities during the current breaking process.

The present disclosure also provides a switching apparatus showing high levels of reliability in operation.

The present disclosure also provides a switching apparatus having electric poles with high compactness and structural simplicity.

The present disclosure also provides a switching apparatus that can be easily manufactured at industrial level, at competitive costs with respect to the solutions of the state of the art.

The present disclosure provides a switching apparatus, according to the following claim 1 and the related dependent claims.

In a general definition, the switching apparatus of the present disclosure includes one or more electric poles.

For each electric pole, the switching apparatus includes a first pole terminal, a second pole terminal and a ground terminal. In operation, the first pole terminal can be electrically coupled to a first conductor of an electric line, the second pole terminal can be electrically coupled to a second conductor of said electric line and the ground terminal can be electrically coupled to a grounding conductor.

For each electric pole, the switching apparatus includes a plurality of fixed contacts spaced apart one from another around a main longitudinal axis of the switching apparatus. Such a plurality of fixed contacts includes a first fixed contact electrically connected to the first pole terminal, a second fixed contact electrically connected to the second pole terminal, a third fixed contact electrically connected to the ground terminal and a fourth fixed contact, which, in operation, is electrically connectable with the second fixed contact.

For each electric pole, the switching apparatus further includes a movable contact, which is reversibly movable about a corresponding rotation axis according to opposite first and second rotation directions, so that said movable contact can be coupled to or uncoupled from one or more of the above-mentioned fixed contacts, and a vacuum interrupter, which includes a fixed arc contact electrically connected to the first pole terminal, a movable arc contact electrically connected to the fourth fixed contact and reversibly movable along a corresponding translation axis between a coupled position with the fixed arc contact and an uncoupled position from the fixed arc contact. The vacuum interrupter further includes a vacuum chamber, in which the fixed arc contact and the movable arc contact are enclosed and can be coupled or decoupled.

For each electric pole, the switching apparatus further includes a motion transmission mechanism operatively coupled to the movable arc contact.

The motion transmission mechanism is actuatable by the movable contact to cause a movement of said movable arc contact along said translation axis, when said movable contact moves about said rotation axis.

According to the present disclosure, the motion transmission mechanism includes a first lever element pivoted on a fixed support at a first hinge point and a second lever element pivoted on the contact shaft at a second hinge point.

Said first and second lever elements are pivoted one on another at a third hinge point.

Said motion transmission mechanism may be configured to take a first configuration, at which the movable third hinge point is in a first position and the movable arc contact is in a coupled position with the fixed arc contact, and a second configuration, at which the movable third hinge point is in a second position, spaced apart from said first position, and the movable arc contact is in an uncoupled position from the fixed arc contact.

The motion transmission mechanism may be configured to maintain stably said first configuration or said second configuration, if said motion transmission mechanism is not actuated by said movable contact.

The motion transmission mechanism may be configured to change its configuration, if said motion transmission mechanism is actuated by said movable contact.

In particular, the motion transmission mechanism is configured to switch from said first configuration to said second configuration upon an actuation by said movable contact, when the movable contact moves according to said first rotation direction and electrically connects the fourth fixed contact to the second fixed contact. A transition of the motion transmission mechanism from said first configuration to said second configuration causes a movement of the movable arc contact from said coupled position to said uncoupled position.

According to an aspect of the present disclosure, the motion transmission mechanism is configured to switch from said second configuration to said first configuration upon an actuation by said movable contact, when the movable contact moves according to said second rotation direction and electrically connects the first fixed contact to the second fixed contact. A transition of the motion transmission mechanism from said second configuration to said first configuration causes a movement of the movable arc contact from said uncoupled position to said coupled position.

The motion transmission mechanism may be configured to switch from said first configuration to said second configuration or, vice-versa, from said second configuration to said first configuration, upon an actuation of the first lever element by the movable contact.

The first lever element of the motion transmission mechanism may include a first lever portion and a second lever portion, which are spaced apart one from another.

The motion transmission mechanism may be configured to switch from the first configuration to the second configuration, upon an actuation of said first lever portion by said movable contact.

The motion transmission mechanism may be configured to switch from the second configuration to the first configuration, upon an actuation of said second lever portion by said movable contact.

The first and second lever portions of the first lever element may be actuated by said movable contact at different points of the motion trajectory of said movable contact.

Further characteristics and advantages of the present disclosure will emerge from the description of embodiments of the switching apparatus according to the present disclosure, non-limiting examples of which are provided in the attached drawings.

DETAILED DESCRIPTION

Figure 1:
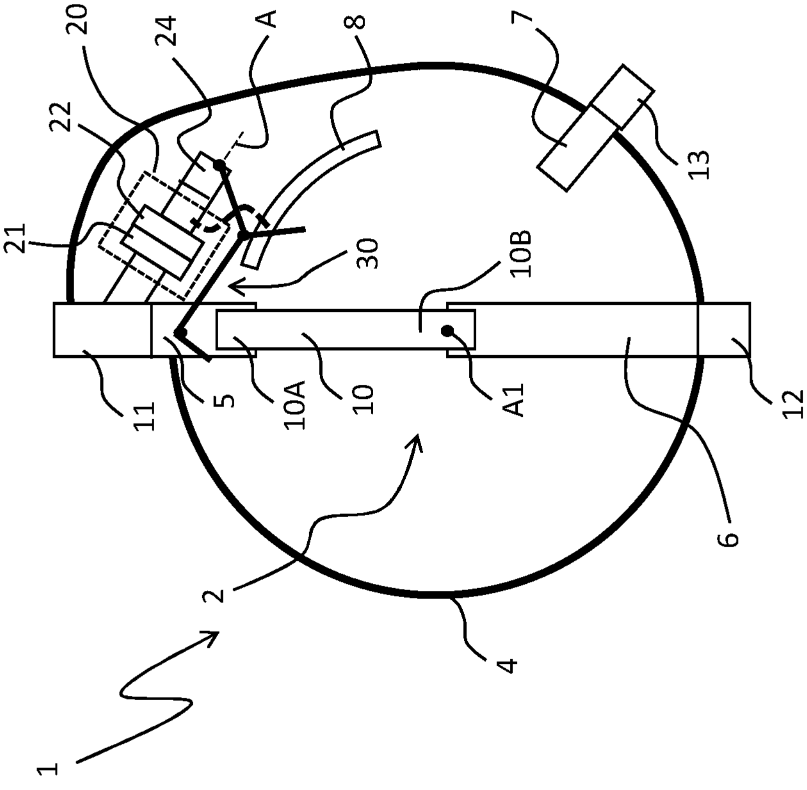
FIGS. 1-8 are schematic views partially showing the structure and operation of an embodiment of the switching apparatus, according to the present disclosure.

With reference to the figures, the present disclosure relates to a switching apparatus 1 for medium voltage electric systems.

For the purposes of the present disclosure, the term "medium voltage" (MV) relates to operating voltages at electric power distribution level, which are higher than 1 kV AC and 1.5 kV DC up to some tens of kV, e.g., up to 72 kV AC and 100 kV DC.

For the purposes of the present disclosure, the terms "terminal" and "contact" should be hereinafter intended, unless otherwise specified, as "electric terminal" and "electric contact", respectively, thereby referring to electrical components suitably arranged to be electrically connected or coupled to other electrical conductors.

The switching apparatus 1 may be adapted to operate as a load-break switch. It is therefore designed for providing circuit-breaking functionalities under specified circuit conditions (nominal or overload conditions) as well as circuit-disconnecting functionalities, and may be designed for grounding a load-side section of an electric circuit.

As it will better emerge from the following, the switching apparatus 1 may be of the "single-disconnection" type (embodiment of FIGS. 1-8) or the "double-disconnection" type (embodiment of FIGS. 9-16) depending on how the current path through each electric pole is interrupted when the switching apparatus is in an open state.

The switching apparatus 1 includes one or more electric poles 2.

The switching apparatus 1 may be of the multi-phase (e.g. three-phase) type and it may include a plurality (e.g. three) of electric poles 2.

According to embodiments of the present disclosure (shown in the cited figures), the switching apparatus 1 is a self-standing product.

In this case, the switching apparatus 1 may include an insulating housing 4, which conveniently defines an internal volume where the electric poles 2 are accommodated.

The insulating housing 4 may have an elongated shape (e.g., substantially cylindrical) developing along a main longitudinal axis. The electric poles 2 are arranged side by side along corresponding transversal planes perpendicular the main longitudinal axis of the switching apparatus.

In the following, the switching apparatus of the present disclosure will be described with reference to these embodiments for the sake of brevity only and without intending to limit the scope of the present disclosure. In fact, according to other embodiments of the present disclosure (not shown), the switching apparatus might be installed in a cubicle together with other electric devices. In this case, the switching apparatus may not include a dedicated housing as shown in the cited figures.

The internal volume of the switching apparatus 1 may be filled with pressurized dry air or another insulating gas having a low environmental impact, such as a mixture of oxygen, nitrogen, carbon dioxide and/or a fluorinated gas.

For each electric pole 2, the switching apparatus 1 includes a first pole terminal 11, a second pole terminal 12 and a ground terminal 13.

The first pole terminal 11 is configured to be electrically coupled to a first conductor of an electric line (e.g., a phase conductor electrically connected to an equivalent electric power source), the second pole terminal 12 is configured to be electrically connected to a second conductor of an electric line (e.g., a phase conductor electrically connected to an equivalent electric load) while the ground pole terminal 13 is configured to be electrically connected to a grounding conductor.

According to the present disclosure, for each electric pole 2, the switching apparatus 1 includes a plurality of fixed contacts, which are spaced apart one from another and may be arranged around a main longitudinal axis A1 of the switching apparatus.

For each electric pole, the switching apparatus 1 includes a first fixed contact 5, a second fixed contact 6, a third fixed contact 7 and a fourth fixed contact 8.

The first fixed contact 5 is electrically connected to the first pole terminal 11, the second fixed contact 6 is electrically connected to the second pole terminal 12, the third fixed contact 7 is electrically connected to the ground pole terminal 13 while the fourth fixed contact 8 is electrically connected to a vacuum interrupter of the switching apparatus as better explained in the following. In some operating conditions of the switching apparatus, the fourth fixed contact 8 can be electrically connected with the second fixed contact 6.

When the switching apparatus is of the "single-disconnection" type (FIGS. 1-8), the third fixed contact 7 and the fourth fixed contact 8 may be arranged between the first fixed contact 1 and the second fixed contact 6 on a same side of the switching apparatus, respectively in distal and proximal position with respect to the first fixed contact 5.

When the switching apparatus is of the "double-disconnection" type (FIGS. 9-16), the third fixed contact 7 and the fourth fixed contact 8 may be arranged between the first fixed contact 5 and the second fixed contact 6 at opposite sides of the switching apparatus.

The fixed contacts 5, 6, 7, 8 may be made of electrically conductive material.

When the switching apparatus is of the "single-disconnection" type (FIGS. 1-8), the fixed contacts 5, 6, 7 are each formed by a piece of conductive material having one end coupled to the corresponding pole terminal 11, 12, 13 and an opposite blade-shaped free end while the fixed contact 8 is formed by a piece of conductive material electrically connected to the vacuum interrupter and having an arc-shaped free end.

When the switching apparatus is of the "double-disconnection" type (FIGS. 9-16), the second fixed contact 6 has a different configuration and it includes an arc-shaped body extending partially around a main longitudinal axis of the switching apparatus.

In principle, however, each fixed contact 5, 6, 7, 8 may be realized according to other solutions of known type, which are here not described in detail for the sake of brevity.

The switching apparatus 1 includes, for each electric pole 2, a movable contact 10 reversibly movable (along a given plane of rotation) about a corresponding first rotation axis A1, which is substantially parallel to or coinciding with the main longitudinal axis of the switching apparatus.

The movable contact 10 can rotate according to a first rotation direction R1, which is conveniently oriented away from the first fixed contact 5, or according to a second rotation direction R2, which is opposite to the first rotation direction R1 and is oriented towards the first fixed contact 5.

With reference to an observation plane of the cited figures, the above-mentioned first rotation direction R1 is oriented clockwise while the above-mentioned second rotation direction R2 is oriented counter-clockwise.

As the movable contact 10 is reversibly movable about the first rotation axis A1, the movable contact 6 can be coupled to or uncoupled from one or more of the fixed contacts 5, 6, 7, 8, thereby being electrically connected or electrically disconnected from these fixed contacts.

In general, as better evidenced in the following, the fixed contacts 5, 6, 7, 8 and the movable contact 10 are arranged so that:

- when the movable contact 10 is coupled to the first fixed contact 5, it electrically connects this latter with the second fixed contact 6;
- when the movable contact 10 is coupled to the third fixed contact 7, it electrically connects this latter with the second fixed contact 6;
- when the movable contact 10 is coupled to the fourth fixed contact 8, it electrically connects this latter with the second fixed contact 6.

When the switching apparatus is of the "single-disconnection" type (FIGS. 1-8), the movable contact 10 includes a conductive body having a first contact portion 10A (FIG. 1) that can be coupled to or uncoupled from the first, third and fourth fixed contacts 5, 7, 8 and a second contact portion 10B (FIG. 1) connected electrically with the second fixed contact 6. According to this embodiment of the present disclosure, therefore, the electric current path is interrupted only at the first contact portion 10A ("single disconnection"), when the switching apparatus 1 is in an open state (FIG. 4).

When the switching apparatus is of the "double-disconnection" type (FIGS. 9-16), the movable contact 10 includes a conductive body having a first contact portion 10A (FIG. 9) that can be coupled to or uncoupled from the first, second, and fourth fixed contacts 5, 6, 8 and a second contact portion 10B (FIG. 9) that can be coupled to or uncoupled from the second and third fixed contacts 6, 7.

Figure 12:
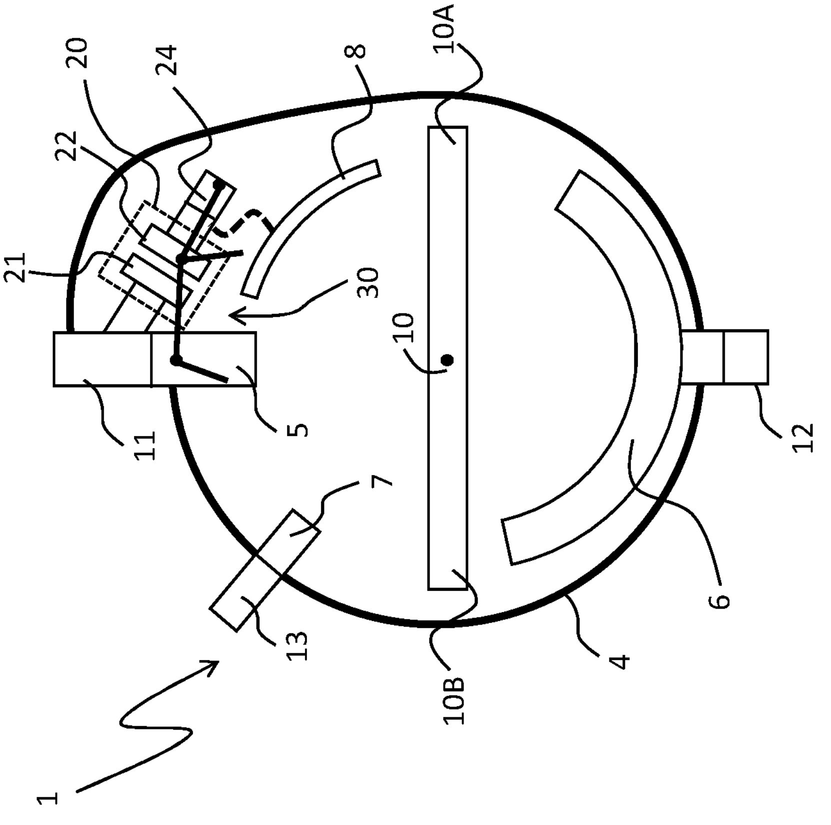
Figure 13:
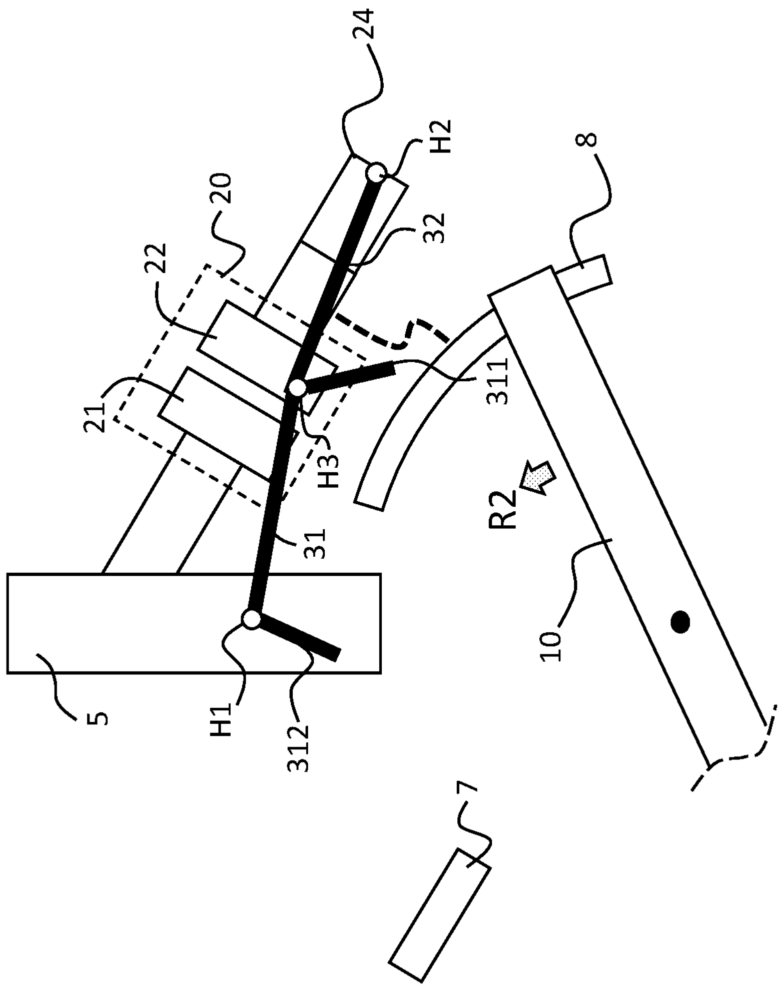
Figure 14:
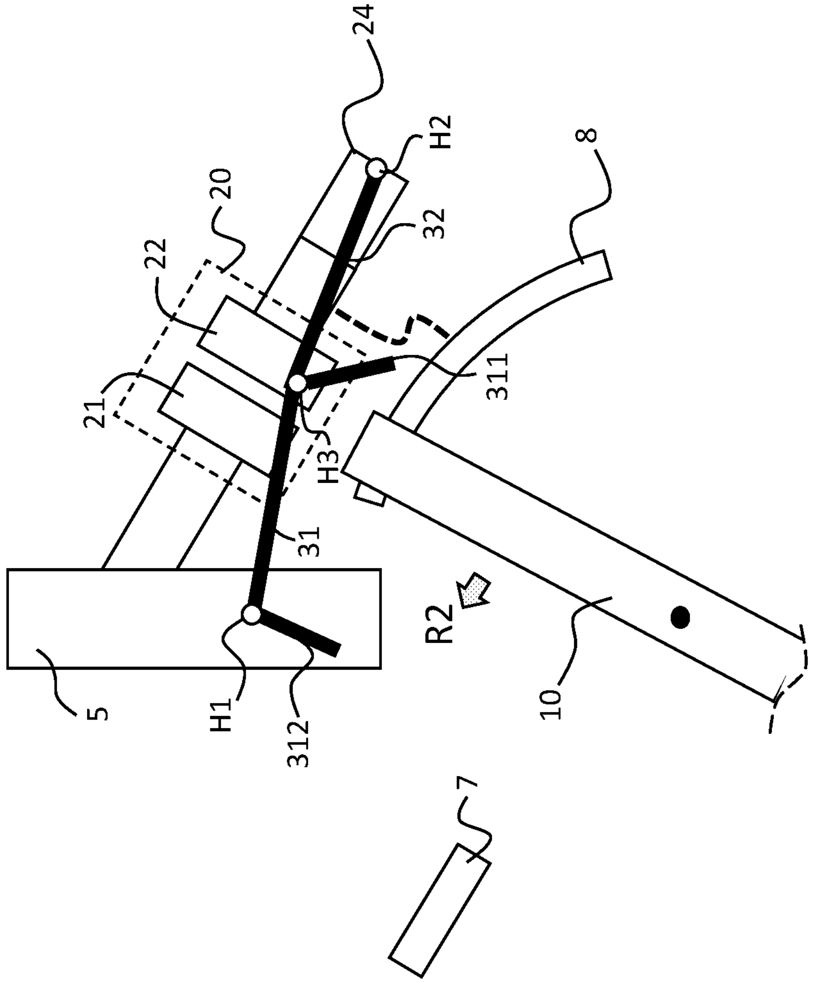
Figure 15:
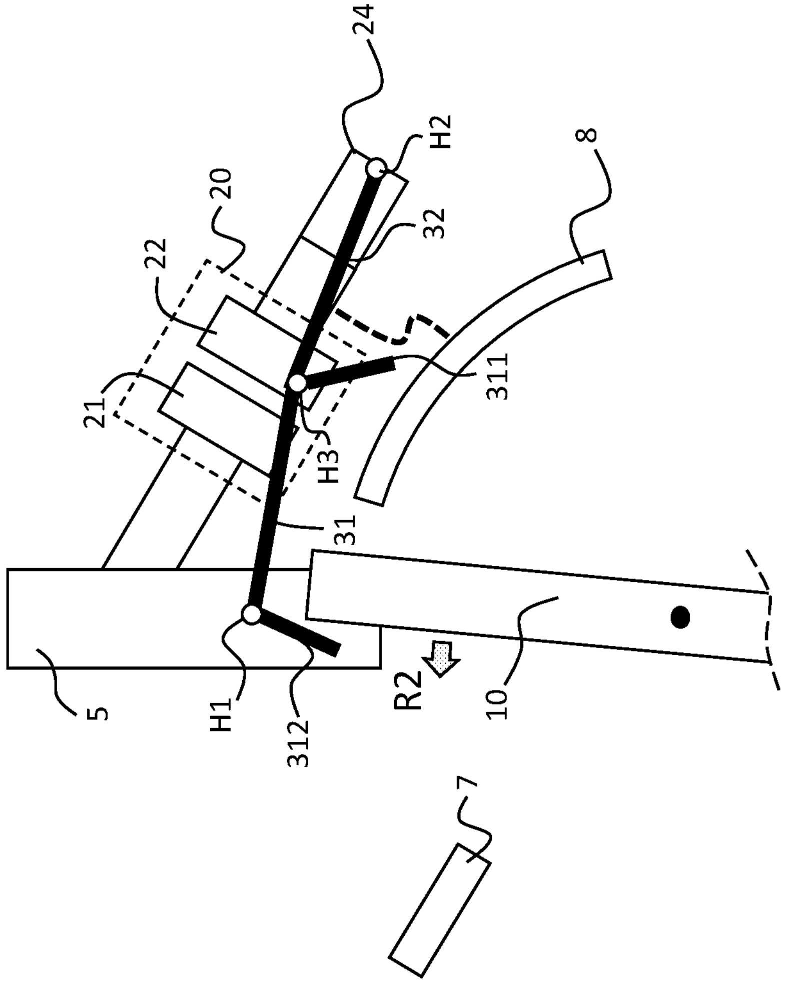

According to this embodiment of the present disclosure, therefore, the electric current path is interrupted at both the contact portions 10A and 10B ("double disconnection"), when the switching apparatus 1 is in an open state (FIG. 12).

The movable contact 10 may be formed by a blade-shaped body of conductive material.

When the switching apparatus is of the "single-disconnection" type (FIGS. 1-8), the blade 10 has a free first end forming the first movable contact portion 10A intended to couple to or decouple from the first, third and fourth fixed contacts 5, 7, 8 and an opposite second end forming the second movable contact portion 10B and pivoted on the second contact 6 at the first rotation axis A1.

When the switching apparatus is of the "double-disconnection" type (FIGS. 9-16), the blade 10 is hinged centrally on the first rotation axis A1 and has opposite free ends 10A, 10B intended to couple with the fixed contacts 5, 6, 7, 8. In particular, the first free end forms the first movable contact portion 10A and is intended to couple to or decouple from the first fixed contact 5, second fixed contact 6 and fourth fixed contact 8 while the second free end forms the second movable contact portion 10B and is intended to couple to or decouple from the second fixed contact 6 and third fixed contact 7.

The first and second free ends 10A, 10B of the movable contact 10 may be aligned one to another along a same direction. However, according to other variants of the present disclosure (not shown), the first and second free ends 10A, 10B of the movable contact 10 are aligned along different directions, which cross and form an angle at the rotation axis A1. This solution allows reducing the overall size of the second fixed contact 6.

In principle, however, the movable contact 10 may be realized according to other solutions of known type, which are here not described in detail for the sake of brevity.

The switching apparatus 1 may include an actuation assembly (not shown) providing suitable actuation forces to actuate the movable contacts 10 of the electric poles.

Such an actuation assembly may include a motion transmission shaft made of electrically insulating material, which can rotate about the first rotation axis A1 and is coupled to the movable contacts 10 of the electric poles 2.

The motion transmission shaft thus provides rotational mechanical forces to actuate the movable contacts 10 of the electric poles during the maneuvers of the switching apparatus.

The above-mentioned actuation assembly may include an actuator coupled to the transmission shaft through a suitable kinematic chain. The actuator may be, for example, a mechanical actuator, an electric motor or an electromagnetic actuator.

In general, the actuation assembly of the switching apparatus may be realized according to solutions of known type. Therefore, in the following, it will be described only in relation to the aspects of interest of the present disclosure, for the sake of brevity.

According to the present disclosure, for each electric pole 2, the switching apparatus 1 includes a vacuum interrupter 20.

The vacuum interrupter 20 includes a fixed arc contact 21 electrically connected to the first pole terminal 11, and the fixed arc contact 21 may be electrically connected in parallel to the first fixed contact 5.

The fixed arc contact 21 may be formed by an elongated piece of conductive material having one end coupled to the first pole terminal 11 and an opposite free end intended to be coupled with or decoupled from another arc contact.

In principle, however, the fixed arc contact 21 may be realized according to other solutions of known type, which are here not described in detail for the sake of brevity.

The vacuum interrupter 20 includes a movable arc contact 22 reversibly movable along a corresponding translation axis A (FIG. 1), which may be aligned with a main longitudinal axis of the vacuum interrupter.

As it is reversibly movable about the displacement axis A, the movable arc contact 22 can be coupled to or uncoupled from the fixed arc contact 21, thereby being electrically connected to or electrically disconnected from this latter.

The movable arc contact 22 is electrically connected to the fourth fixed contact 8, and the movable arc contact 22 may be electrically connected to the fourth fixed contact 8 through a conductor (e.g., a flexible conductor) or other equivalent connection means.

The movable arc contact 22 may be solidly coupled to a contact shaft 24, which may be configured to transmit motion to the movable arc contact 22 and which may be made, at least partially, of an electrically insulating material.

The contact shaft 24 may be aligned with the movable arc contact 22 along the translation axis A.

According to possible variants of the present disclosure (not shown), the contact shaft 24 is coupled with a compression spring coaxially arranged to exert a constant compression force, which is directed to press the movable arc contact 22 towards the fixed arc contact 21, thereby opposing to any movement of the movable arc contact 22 away from the fixed arc contact 21.

The movable arc contact 22 may be formed by an elongated piece of conductive material having one end coupled to the contact shaft 24 and an opposite free end intended to be coupled with or decoupled from the fixed contact 21.

In principle, however, the mobile arc contact 22 may be realized according to other solutions of known type, which are here not described in detail for the sake of brevity.

The vacuum interrupter 20 includes a vacuum chamber 23, in which a vacuum atmosphere is present.

Conveniently, the fixed arc contact 21 and the movable arc contact 22 are enclosed in the vacuum chamber 23 and they are mutually coupled or decoupled inside said vacuum chamber, therefore being permanently immersed in a vacuum atmosphere.

According to the present disclosure, for each electric pole 2, the switching apparatus 1 includes a motion transmission mechanism 30 operatively coupled to the movable arc contact 22 (the transmission mechanism 30 may be coupled to the contact shaft 24) and actuatable by the movable contact 10 to cause a movement of the movable arc contact 22, when such a movable contact moves about its rotation axis A1.

The motion transmission mechanism 30 includes a first lever element 31 pivoted on a fixed support (which may be the first fixed contact 5 as shown in the cited figures) at a fixed first hinge point H1. The first hinge point H1 is “fixed” in the sense that it cannot be subject to any translation with respect to the support 5 on which the first lever element 31 is pivoted. The first lever element 31 can thus only rotate about a second rotation axis passing through the hinge point H1 and may be parallel to the rotation axis A1 of the movable contact 10.

The motion transmission mechanism 30 includes also a second lever element 32 pivoted on the movable arc contact 22 (the second lever element 32 may be pivoted on the contact shaft 24 solidly coupled to the movable arc contact 22) at a fixed second hinge point H2. Similarly, to the first hinge point H1, the second hinge point H2 cannot be subject to any translation with respect to the movable arc contact 22, on which the second lever element 32 is pivoted. Obviously, the second fixed hinge point 2 moves together with the movable arc contact 22.

The second lever element 32 can thus rotate only about a third rotation axis passing through the hinge point H2 and may be parallel to the rotation axis A1 of the movable contact 10.

It is noted that the first and second lever elements 31, 32 rotate according to opposite directions about the respective fixed hinge points H1, H2 when the motion transmission mechanism 30 is actuated by the movable contact 10.

The first and second lever element 31 are pivoted one on another at a movable third hinge point H3. The third hinge point H3 is “movable” in the sense that it can be subject to opposite translation movements along a reference plane, which may include the hinge points H1, H2. Both the first and second lever elements 31, 32 can therefore rotate (conveniently according to opposite relative rotation directions) about a further rotation axis passing through the hinge point H3 and may be parallel to the rotation axis A1 of the movable contact 10.

The lever elements 31, 32 may be made of electrically insulating material.

The first lever element 31 may include first and second portions 311, 312 that are intended to be actuated by the movable contact 10, when this latter rotates about its rotation axis. The first and second portions 311, 312 are conveniently spaced apart one from another.

In the embodiments shown in the cited figures, the first lever element 31 is made by a shaped rod of electrically insulating material (which can be realized in one piece or in multiple pieces solidly coupled one to another) having a first folded rod portion 311 pivoted on the second lever element 32 at the third hinge point H3, a second folded rod portion 312 pivoted on a fixed support 5 at the first hinge point H1 and an intermediate rod portion 313 joining the rod portions 311, 312. Conveniently, the first and second rod portions 311, 312 are intended to mechanically interact with the movable contact 10 (particularly with the contact portion 10A of this latter), when this latter rotates about its rotation axis. To this aim, the first and second rod portions 311, 312 have corresponding free ends oriented towards the motion path of the movable contact 10.

In the embodiments shown in the cited figures, the second lever element 32 is made by a shaped rod of electrically insulating material (which can be realized in one piece or in multiple pieces solidly coupled one to another) having an end pivoted on the first lever element 31 at the third hinge point H3 and an opposite end pivoted on the contact shaft 24.

In principle, however, the first and second lever elements 31, 32 may have different shapes compared to those shown in the cited figures, depending on the relative positions of the hinge points H1, H2, H3. As an example, the first lever element 31 may be formed by a reversed-V shaped piece of electrically insulating material having suitable coupling profiles with the movable contact 10 while the second lever element 32 may be formed by a blade of electrically insulating material.

As mentioned above, the hinge point H3 is subject to translation movements during the operation of the switching apparatus.

The motion transmission mechanism 30 may be configured to take alternatively a first configuration C1, at which the third hinge point H3 is in a first position P1 and a second configuration C2, at which the third hinge point H3 is in a second position P2, which is spaced apart from the first position P1.

The first configuration C1 of the motion transmission mechanism 30 corresponds to a closed condition of the vacuum interrupter 20, in the sense that when the third hinge point H3 is in the first position P1, the movable arc contact 22 is in a coupled position P3 with the fixed arc contact 21.

The second configuration C2 of the motion transmission mechanism 30 instead corresponds to an open condition of the vacuum interrupter 20, in the sense that when the third hinge point H3 is in the second position P2, the movable arc contact 22 is in an uncoupled position P4 from the fixed arc contact 21.

The motion transmission mechanism 30 may be configured to maintain stably the first configuration C1 or the second configuration C2, if it is not actuated by the movable contact 10.

The motion transmission mechanism 10 may be configured to switch its configuration, upon an actuation by the movable contact 10. Any transition of configuration of the motion transmission mechanism 30 causes a corresponding movement of the movable arc contact 22 and a consequent change of condition of the vacuum interrupter 20.

The motion transmission mechanism 30 may be configured to switch from the first configuration C1 to the second configuration C2 upon an actuation by the movable contact 10, while this latter is moving according to the first rotation direction R1 and it electrically connects the fourth fixed contact 8 to the second fixed contact 6 (as it is coupled with said fixed contacts). The transition of the motion transmission mechanism 30 from the first configuration C1 to the second configuration C2 causes a corresponding movement of the movable arc contact 22 from the coupled position P3 to the uncoupled position P4.

The motion transmission mechanism 30 may be configured to switch from the first configuration C1 to the second configuration C2 upon an actuation of the first lever element 31 by the movable contact 10. In particular, the motion transmission mechanism 30 switches from the first configuration C1 to the second configuration C2 when the first lever portion 311 of the first lever element 31 is actuated by the movable contact 10, while this latter is rotating according to the first rotation direction R1 and electrically connects the fourth fixed contact 8 to the second fixed contact 6.

The motion transmission mechanism 30 may be configured to switch from the second configuration C2 to the first configuration C1 upon an actuation by the movable contact 10, while this latter is moving according to the second rotation direction R2 and it electrically connects the first fixed contact 5 to the second fixed contact 6 (since it is coupled with said fixed contacts). The transition of the motion transmission mechanism 30 from the second configuration C2 to the first configuration C1 causes a corresponding movement of the movable arc contact 22 from the uncoupled position P4 to the coupled position P3.

The motion transmission mechanism 30 may be configured to switch from the second configuration C2 to the first configuration C1 upon an actuation of the first lever element 31 by the movable contact 10. In particular, the motion transmission mechanism 30 switches from the second configuration C2 to the first configuration C1 when the second lever portion 312 of the first lever element 31 is actuated by the movable contact 10, while this latter is rotating according to the second rotation direction R2 and electrically connects the first fixed contact 5 to the second fixed contact 6.

The first and second lever portions 311, 312 of the first lever element 31 may be actuated by the movable contact 10 at different points of the motion trajectory of this latter.

The mechanical behavior of the motion transmission mechanism 30 and its mechanical interaction with the movable arc contact 22 is briefly described in the following with reference to FIGS. 17 and 18.

Transition from the First Configuration C1 to the Second Configuration C2

Figure 17:
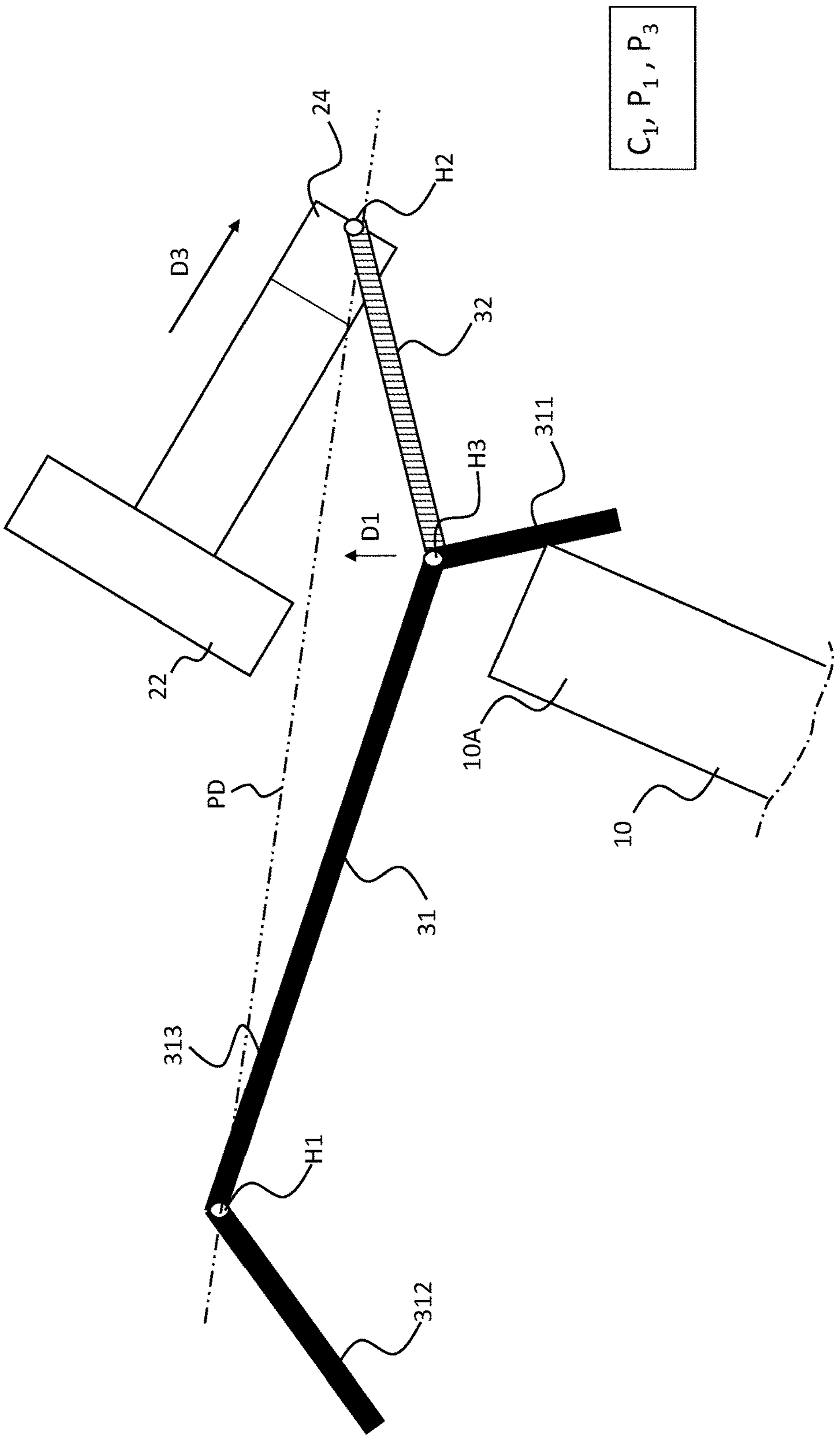
FIGS. 17-18 are schematic views partially showing the operation of a motion transmission mechanism of the switching apparatus, according to the present disclosure.

FIG. 17 shows the motion transmission mechanism 30 in the first configuration C1.

In this case, the third hinge point H3 is in the first position P1, at which the movable arc contact 22 is in the coupled position P3 with the fixed arc contact 21.

The third hinge point H3 is not aligned with the fixed hinge points H1, H2 and the lever elements 31, 32 are relatively positioned one to another, so that the motion transmission mechanism 30 does not exert any force on the contact shaft 24 solidly connected with the movable arc contact 22.

Upon actuation of the first lever portion 311 by the first contact portion 10A of the movable contact 10 (while said movable contact is rotating according to the first rotation direction R1), the first and second lever elements 31, 32 rotate according to opposite directions about the respective fixed hinge points H1, H2.

The third hinge point H3 moves away from the first position P1 and it travels towards the second position P2 (direction D1).

The motion transmission mechanism 30 starts exerting a force on the contact shaft 24, which is directed to decouple the movable arc contact 22 from the fixed arc contact 23.

The movable arc contact 22 thus starts moving away (direction D3) from the fixed arc contact 21 notwithstanding the vacuum attraction force generated by the vacuum atmosphere in the vacuum chamber and, possibly, the compression force exerted by the compression spring coupled to the contact shaft 24.

Figure 18:
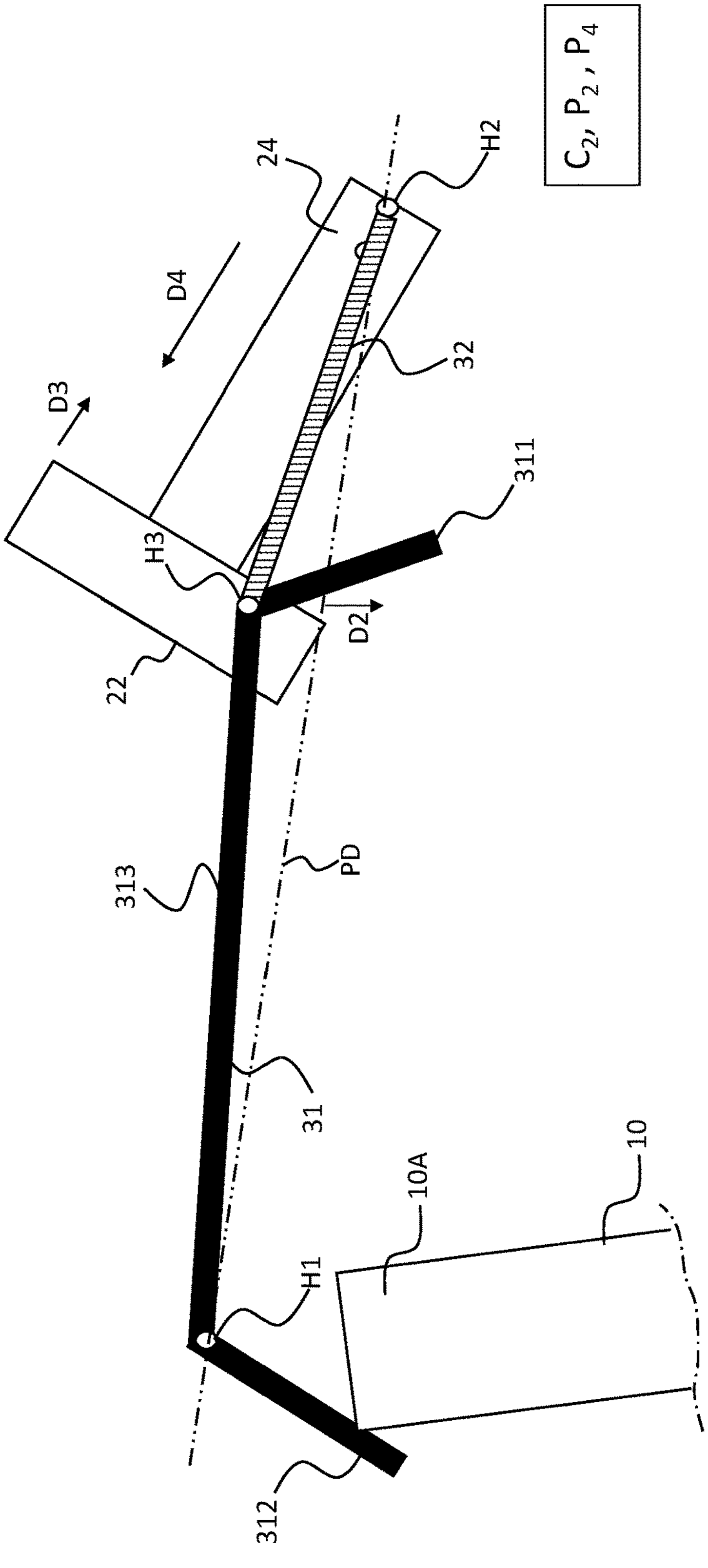

While it is travelling towards the second position P2, the third hinge point H3 passes through an intermediate deadlock position PD, which can be defined as a position of the third hinge point H3, in which this latter is aligned with the fixed hinge points H1 and H2 (with reference to FIGS. 17 and 18, the above-mentioned deadlock position PD lies on the line joining the fixed hinge points H1, H2). In the meanwhile, the movable arc contact 22 continues to move away from the fixed arc contact 21.

As soon as the third hinge point H3 passes beyond the intermediate deadlock position, the movable contact 10 decouples from the first lever portion 311 and stops actuating the first lever element 31.

At the end, the third hinge point H3 reaches the second position P2 (FIG. 18) and the movable arc contact 22 reaches the uncoupled position P4 from the fixed arc contact 21, which is stably maintained due to the force exerted on the movable arc contact 22 by the motion transmission mechanism 30, which opposes to the vacuum attraction force generated by the vacuum atmosphere in the vacuum chamber and, possibly, the compression force exerted by the compression spring coupled to the contact shaft 24.

Transition from the Second Configuration C2 to the First Configuration C1

FIG. 18 shows the motion transmission mechanism 30 in the second configuration C2.

In this case, the third hinge point H3 is in the second position P2, at which the movable arc contact 22 is in the uncoupled position P4 from the fixed arc contact 21.

The third hinge point H3 is not aligned with the fixed hinge points H1, H2 and the lever elements 31, 32 are relatively positioned one to another, so that the motion transmission mechanism 30 exerts a force on the motion transmission element 24, which is directed to maintain the movable arc contact 22 uncoupled from the fixed arc contact 21.

Upon actuation of the second lever portion 312 by the first contact portion 10A of the movable contact 10 (while said movable contact is rotating according to the second rotation direction R2), the first and second lever elements 31, 32 rotate according to opposite directions about the respective fixed hinge points H1, H2.

The third hinge point H3 moves away from the second position P2 and it travels towards the first position P1 (direction D2).

The motion transmission mechanism 30 exerts a further force on the contact shaft 24, which is directed to decouple the movable arc contact 22 from the fixed arc contact 23.

The movable arc contact 22 thus initially moves away from the fixed arc contact 21 (direction D3) notwithstanding the vacuum attraction force generated by the vacuum atmosphere in the vacuum chamber and, possibly, the compression force exerted by the compression spring coupled to the contact shaft 24.

The movable arc contact 22 reaches the maximum distance from the fixed arc contact 21, when the third hinge axis H3 reaches the intermediate deadlock position PD, while moving away from the second position P2.

As soon as the third hinge point H3 passes beyond the intermediate deadlock position PD, the movable contact 10 decouples from the second lever portion 312 and stops actuating the first lever element 31.

The motion transmission mechanism 30 stops exerting a force on the contact shaft 24 solidly connected with the movable arc contact 22. The movable arc contact 22 starts moving towards the fixed arc contact 21 (direction D4) due to the above-mentioned vacuum attraction force and spring compression force.

The third hinge point H3 finally reaches the first position P1 (FIG. 17) and the movable arc contact 22 reaches the coupled position P3 with the fixed arc contact 21, which is stably maintained as the motion transmission mechanism 30 does not exert any force on the movable arc contact 22

The behavior of the motion transmission mechanism 30 and movable arc contact 22 is substantially identical independently on whether the switching apparatus is of the "single-disconnection" type or the "double-disconnection" type.

According to the present disclosure, in operation, the switching apparatus 1 is capable of switching in three different operating states.

In particular, the switching apparatus 1 can switch in:

- a closed state, in which each electric pole 2 has the first and second pole terminals 11, 12 electrically connected one to another and electrically disconnected from the ground terminal 13. When the switching apparatus is in a closed state, a current can flow along each electric pole 2 between the corresponding first and second pole terminals 11, 12;
- an open state, in which each electric pole 2 has the first and second pole terminals 11, 12 and the ground terminal 13 electrically disconnected one from another. When the switching apparatus is in an open state, no currents can flow along the electric poles 2;
- a grounded state, in which each electric pole 2 has the first and second pole terminals 11, 12 electrically disconnected one from another and the second pole terminal 12 and the ground terminal 13 electrically connected one to another. When the switching apparatus is in a grounded state, no currents can flow along the electric poles 2. However, the second pole terminal 12 of each electric pole (and therefore the second line conductor connected thereto) is put at a ground voltage.

According to the present disclosure, in operation, the switching apparatus 1 is capable of carrying out different types of maneuvers, each corresponding to a transition among the above-mentioned operating states.

In particular, the switching apparatus 1 is capable of carrying out:

- an opening maneuver when it switches from a closed state to an open state;
- a closing maneuver when it switches from an open state to a closed state;
- a disconnecting maneuver when it switches from an open state to a grounded state;
- a reconnecting maneuver when it switches from a grounded state to an open state.

The switching apparatus 1 can switch from a closed state to a grounded state by carrying out an opening maneuver and subsequently a disconnecting maneuver while it can switch from a grounded state to a closed state by carrying out a reconnecting maneuver and subsequently a closing maneuver.

In order to carry out the above-mentioned maneuvers of the switching apparatus, the movable contact 10 of each electric pole is suitably driven according to the above-mentioned first rotation direction R1 or second rotation direction R2.

In particular, the movable contact 10 moves according to the first rotation direction R1 during an opening maneuver or a disconnecting maneuver of the switching apparatus and it moves according to the second rotation direction R2 during a closing maneuver or a reconnecting maneuver of the switching apparatus.

In general, the movable contact 10 of each electric pole is reversibly movable between a first end-of-run position $P_A$, which corresponds to a closed state of the switching apparatus, and a second end-of-run position $P_C$, which corresponds to a grounded state of the switching apparatus.

Conveniently, the movable contact 10 passes through an intermediate position $P_B$, which corresponds to an open state of the switching apparatus, when it moves between the first and second end-of-run positions $P_A$, $P_C$.

Conveniently, the movable contact 10 follows an arc-shaped trajectory when it moves between the first and second end-of-run positions $P_A$, $P_C$.

The operation of the switching apparatus 1 for each electric pole 2 is now described in more detail.

Closed State of the Switching Apparatus

Figure 9:
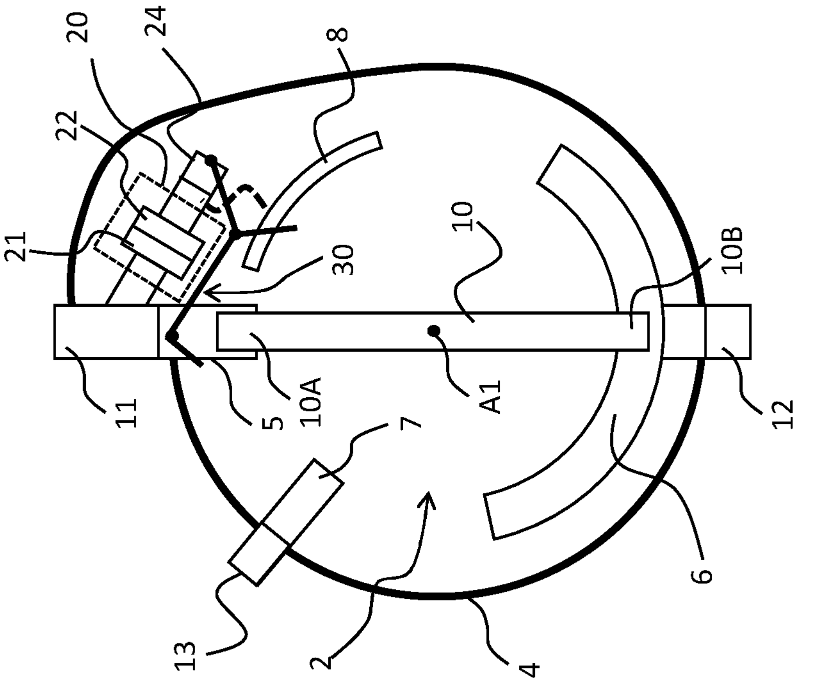
FIGS. 9-16 are schematic views partially showing the structure and operation of another embodiment of the switching apparatus, according to the present disclosure.

When the switching apparatus is in a closed state, each electric pole 2 is in the operating condition illustrated in FIG. 1 ("single-disconnection" configuration) or FIG. 9 ("double-disconnection" configuration).

In this situation, each electric pole 2 has:

- the movable contact 10 in the first end-of-run position $P_A$;
- the movable contact 10 with the first contact portion 10A coupled to the first fixed contact 5 and the second contact portion 10B coupled to the second fixed contact 6;
- the fourth fixed contact 8 electrically disconnected from the second fixed contact 6;
- the motion transmission mechanism 30 in the first configuration C1 with the third hinge point H3 in the first position P1;
- the movable arc contact 22 in a coupled position P3 with the fixed arc contact 21.

The first lever portion 311 of the first lever element 31 is positioned along the motion trajectory of the first contact portion 10A of the movable contact 10 in such a way to be actuatable by this latter when it moves away towards the second intermediate position $P_B$ by rotating along the first rotation direction R1.

The second lever portion 312 of the first lever element 31 is not positioned along the motion trajectory of the movable contact 10.

A current can flow through the electric pole between the first and second pole terminals 11, 12 passing through the first fixed contact 5, the movable contact 10 and the second fixed contact 6. No currents can flow through the vacuum interrupter 20 as the fourth fixed contact 8 is electrically disconnected from the second fixed contact 6.

Open State of the Switching Apparatus

When the switching apparatus is in an open state, each electric pole 2 is in the condition shown in FIG. 4 ("single-disconnection" configuration) or FIG. 12 ("double-disconnection" configuration).

In this situation, each electric pole 2 has:

- the movable contact 10 in the intermediate position $P_B$;
- the movable contact 10 with the first contact portion 10A decoupled from any fixed contact and the second contact portion 10B coupled to the second fixed contact 6, if the switching apparatus is of the "single-disconnection" type (FIG. 4);
- the movable contact 10 with both the first and second contact portions 10A, 10B decoupled from any fixed contact, if the switching apparatus is of the "double-disconnection" type (FIG. 12);
- the first and second fixed contacts 5, 6 electrically connected one to another and electrically disconnected from the third fixed contact 7;
- the first, second and third fixed contacts 5, 6, 7 electrically disconnected one from another;
- the fourth fixed contact 8 electrically disconnected from the second fixed contact 6;
- the motion transmission mechanism in the second configuration C2 with the third hinge point H3 in the second position P2;
- the movable arc contact 22 in an uncoupled position P4 from the fixed arc contact 21.

The first lever portion 311 of the first lever element 31 is not positioned along the motion trajectory of the movable contact 10.

The second lever portion 312 of the first lever element 31 is positioned along the motion trajectory of the first contact portion 10A of the movable contact 10 in such a way to be actuatable by this latter when it moves towards the first end-of-run position $P_A$ by rotating along the second rotation direction R2.

No currents can flow between the first and second pole terminals 11, 12.

Grounded State of the Switching Apparatus

Figure 8:
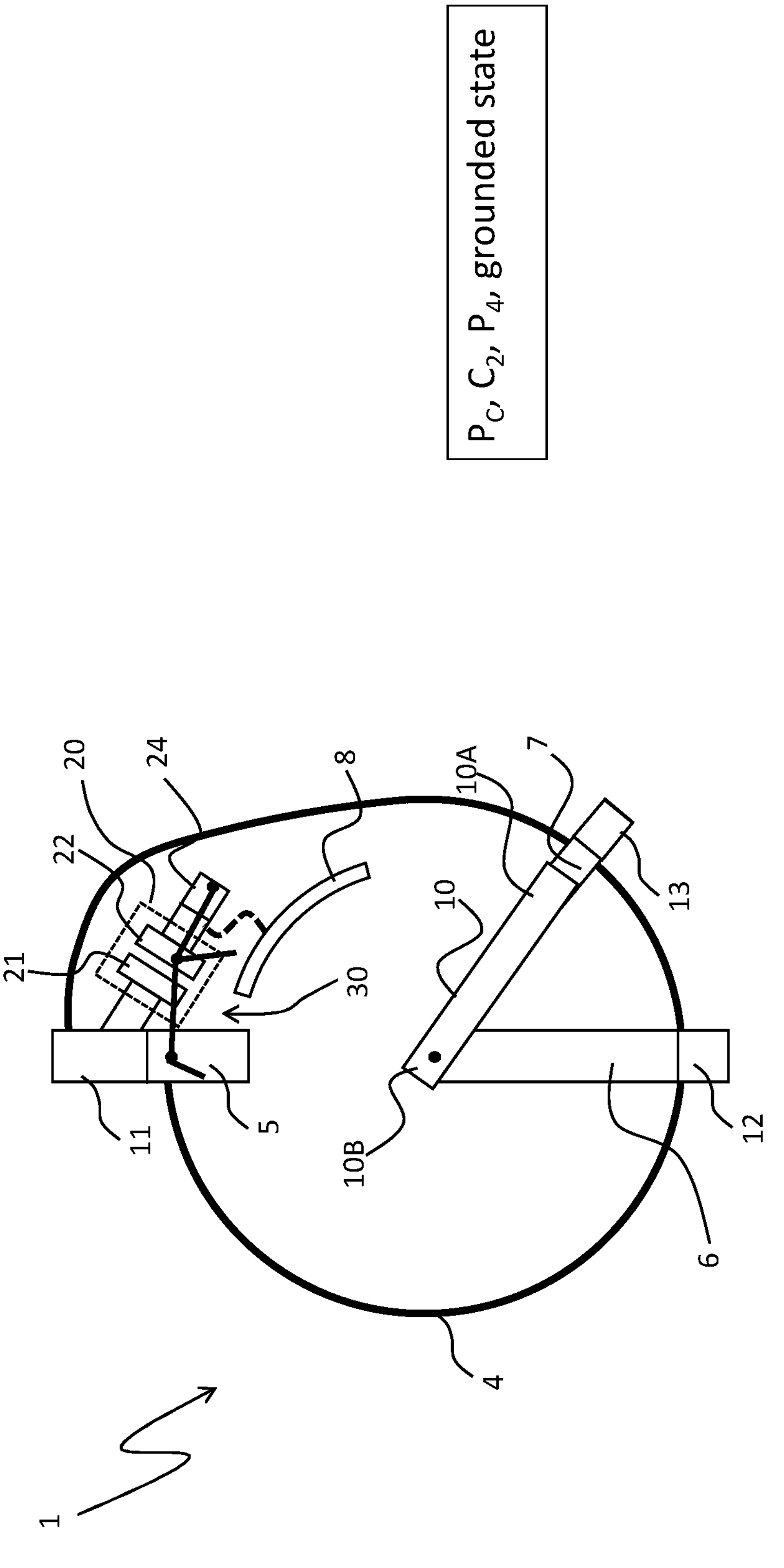
Figure 16:
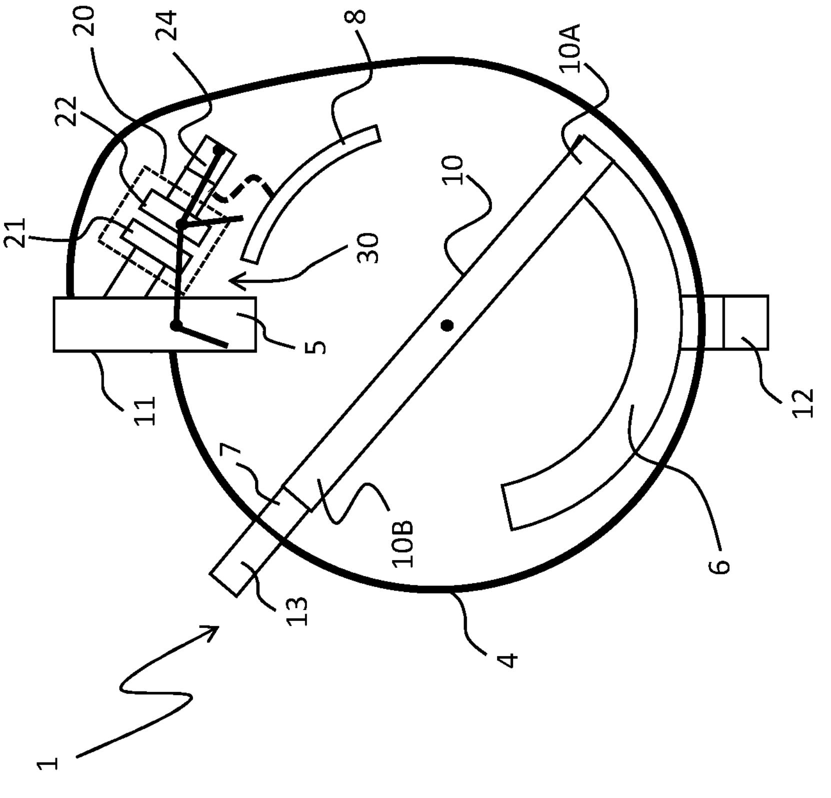

When the switching apparatus is in a grounded state, each electric pole 2 is in the condition illustrated in FIG. 8 ("single-disconnection" configuration) or FIG. 16 ("double-disconnection" configuration).

In this situation, each electric pole 2 has:

- the movable contact 10 in the second end-of-run position $P_C$;
- the movable contact 10 with the first contact portion 10A coupled to the third fixed contact 7 and the second contact portion 10B coupled to the second fixed contact 6, if the switching apparatus is of the "single-disconnection" type (FIG. 8);
- the movable contact 10 with the first contact portion 10A coupled to the second fixed contact 6 and the second contact portion 10B coupled to the third fixed contact 7, if the switching apparatus is of the "double-disconnection" type (FIG. 16);
- the second and third fixed contacts 6 electrically connected one to another and electrically disconnected from the first fixed contact 5;
- the fourth fixed contact 8 electrically disconnected from the second fixed contact 6;
- the motion transmission mechanism in the second configuration C2 with the third hinge point H3 in the second position P2;
- the movable arc contact 22 in an uncoupled position P4 from the fixed arc contact 21.

The first lever portion 311 of the first lever element 31 is not positioned along the motion trajectory of the movable contact 10.

The second lever portion 312 of the first lever element 31 is positioned along the motion trajectory of the first contact portion 10A of the movable contact 10 in such a way to be actuatable by this latter when it moves towards the first end-of-run position $P_A$ by rotating along the second rotation direction R2.

No currents can flow between the first and second pole terminals 11, 12 and the second pole terminal 12 is put at a ground voltage.

Opening Maneuver

The switching apparatus 1 carries out an opening maneuver, when it switches from the closed state to the open state.

During an opening maneuver of the switching apparatus, the movable contact 10 moves, according to the first rotation direction R1, between the first end-of-run position $P_A$ and the intermediate position $P_B$. The movable contact 10 thus moves away from the corresponding first fixed contact 5.

Figure 2:
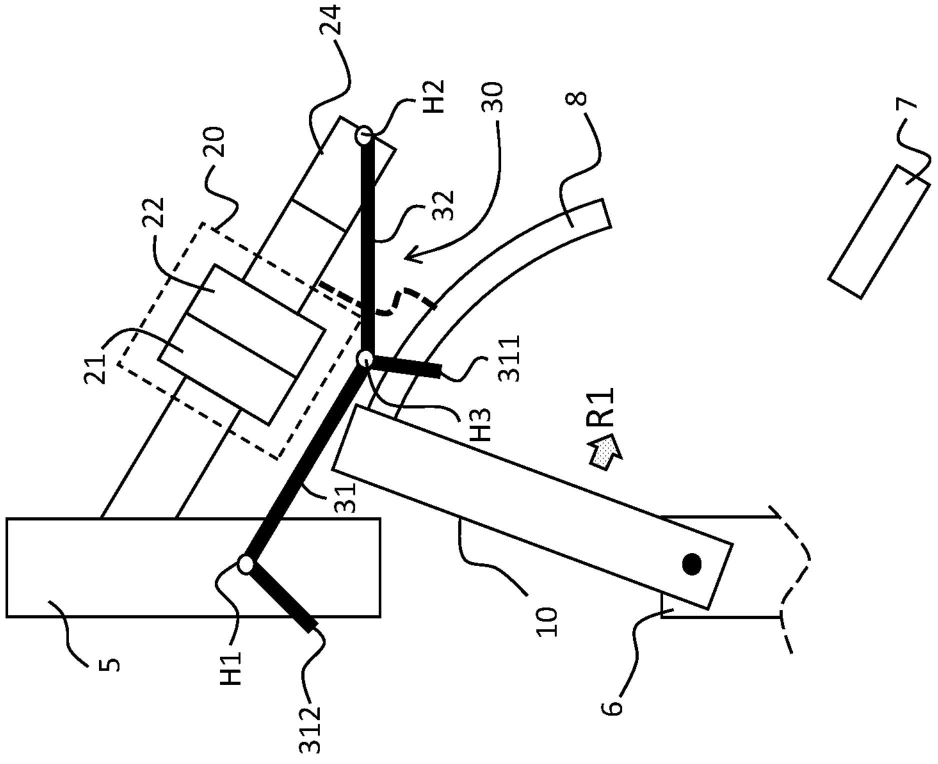
Figure 10:
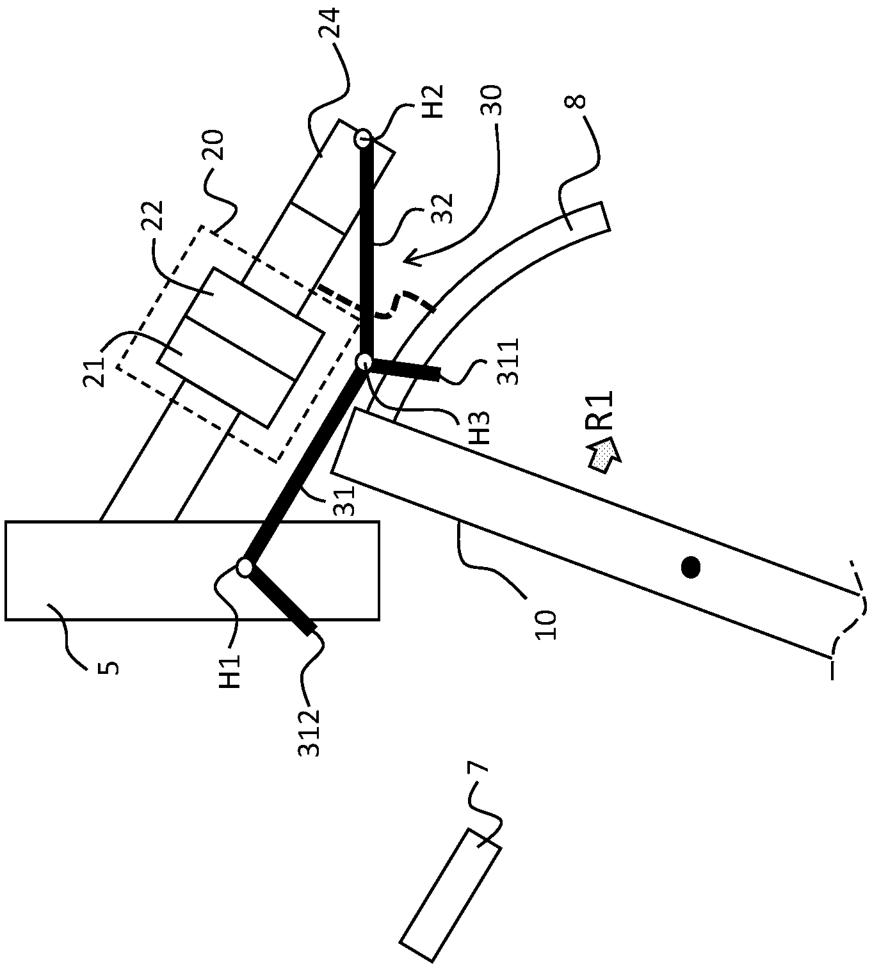

When the movable contact 10 starts moving according to the first rotation direction R1, the movable contact 10 couples to the fourth fixed contact 8 (at the movable contact portion 10A). The movable contact 10 remains coupled to the second fixed contact 6. In this way, the movable contact 10 electrically connects also the fourth fixed contact 8 with the second fixed contact 6 (FIGS. 2 and 10).

The first and fourth fixed contacts 5 and 8 are mutually positioned so that the movable contact 10 couples with the fourth fixed contact 8 before decoupling from the first fixed contact 5.

In this transitory situation, both the first fixed contact 5 and the fourth fixed contact 8 are electrically connected with the second fixed contact 6. A current can flow between the first and second pole terminals 11, 12 passing through the first fixed contact 5 and the vacuum interrupter 20 in parallel. Obviously, most of the current will flow along the first fixed contact 5 as the current path passing through this electric contact has a lower equivalent resistance with respect to the current path passing through the vacuum interrupter.

When it finally decouples from the first fixed contact 5, the movable contact 10 electrically disconnects the first fixed contact 5 from the second fixed contact 6. In this situation, a current flowing along the electric pole is fully deviated through the vacuum interrupter 20 as no current can flow through the first fixed contact 5. The formation of electric arcs at the movable contact 10 is thus prevented.

At this stage of the opening maneuver, the movable contact 10 does not interact with the second lever portion 312 of the first lever element 31 as this latter is not positioned along the motion trajectory of the movable contact 10. The motion transmission mechanism thus initially maintains the first configuration C1 and the movable arc contact 21 remains initially coupled with the fixed arc contact 21.

Figure 3:
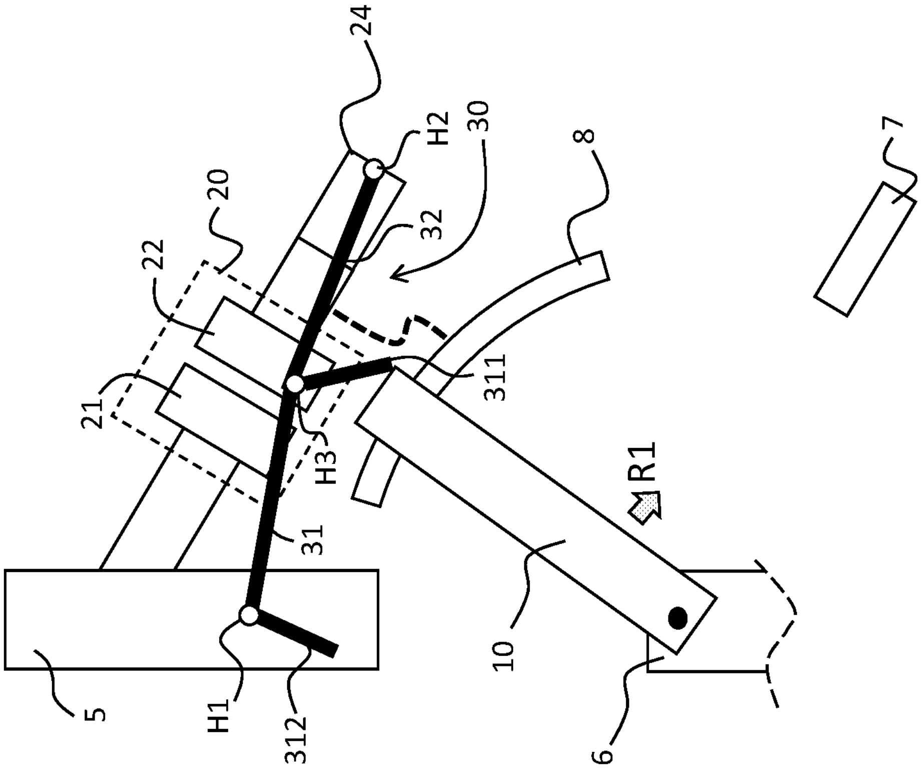
Figure 4:
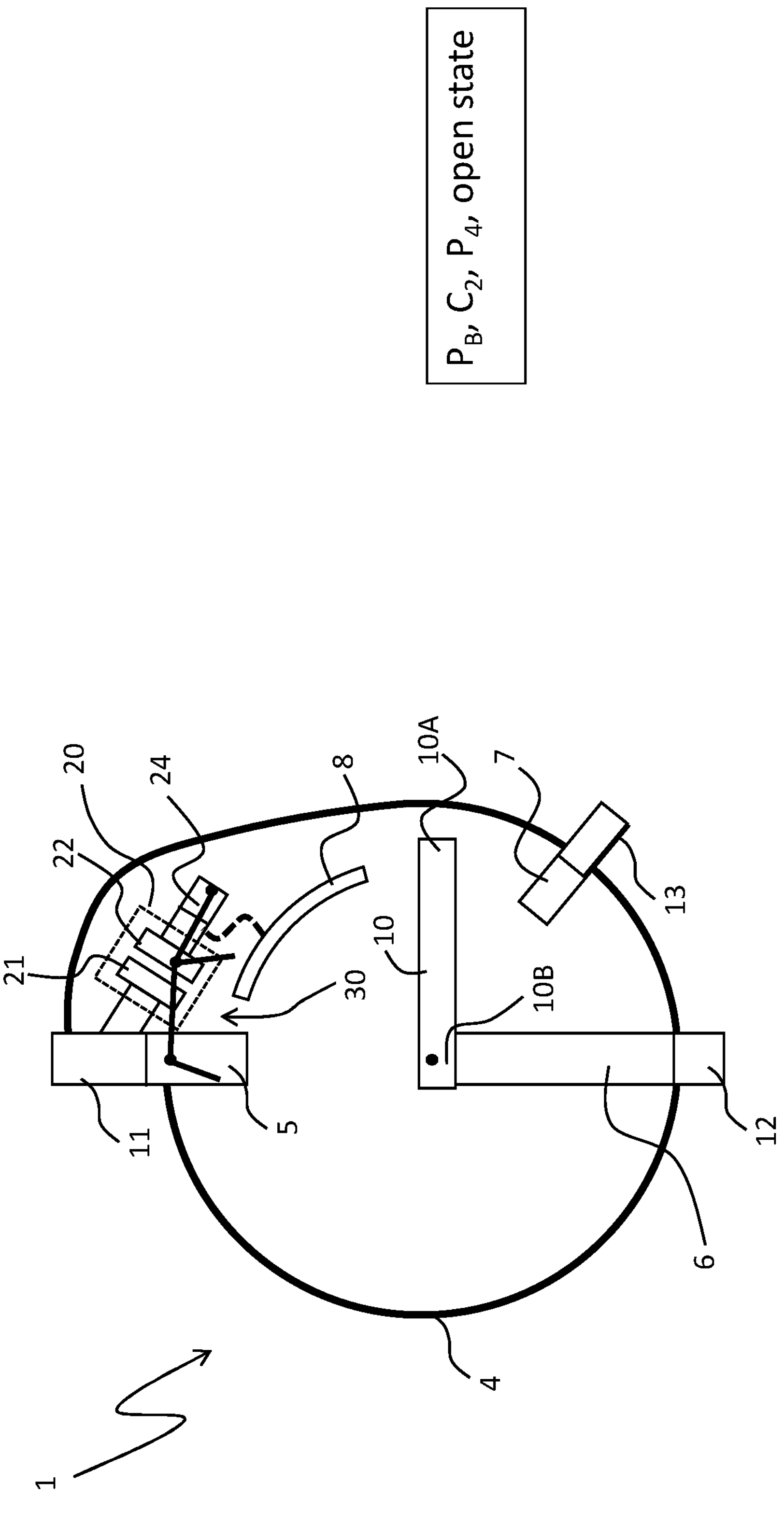
Figure 11:
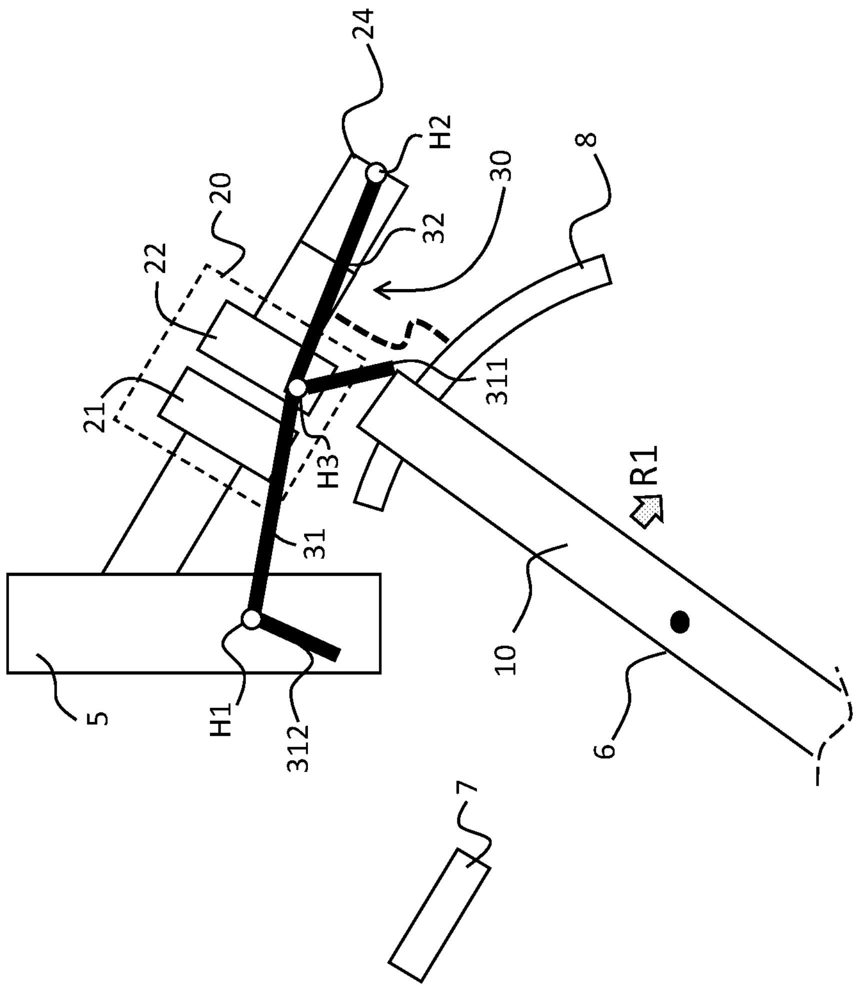

Upon a further movement towards the intermediate position $P_B$, the movable contact 10 couples to the first lever portion 311 and actuates the first lever element 31 while remaining slidingly coupled to the fourth fixed contact 8 (FIGS. 3 and 11).

The actuation of the first lever element 31 by the movable contact 10 causes a transition of the motion transmission mechanism 30 from the first configuration C1 to the second configuration C2 and a consequent movement D3 of the movable arc contact 22 from the coupled position P3 with the fixed arc contact 21 to the uncoupled position P4 from the fixed arc contact 21.

The separation of the electric contacts 21, 22 causes the rising of electric arcs between said electric contacts. However, since the electric contacts 21, 22 are immersed in a vacuum atmosphere, such electric arcs can be quenched efficiently, thereby quickly leading to the interruption of the current flowing along the electric pole.

Upon a further movement towards the intermediate position $P_B$, according to the first rotation direction R1, the movable contact 10 decouples from the motion transmission mechanism 30, which remains in the second configuration C2, and from the fourth fixed contact 8, thereby electrically disconnecting this latter from the second fixed contact 6.

If the switching apparatus is of the "single-disconnection" type, the movable contact 10 remains coupled to the second fixed contact 6.

If the switching apparatus is of the "double-disconnection" type, the movable contact 10 decouples also from the second fixed contact 6.

The movable contact 10 then reaches the intermediate position $P_B$, which corresponds to an open state of the switching apparatus (FIGS. 4 and 12).

Closing Maneuver

The switching apparatus 1 carries out a closing maneuver, when it switches from the open state to the close state.

Before carrying out a closing maneuver, the switching apparatus may have carried out a reconnecting maneuver in order to switch in an open state.

Figure 5:
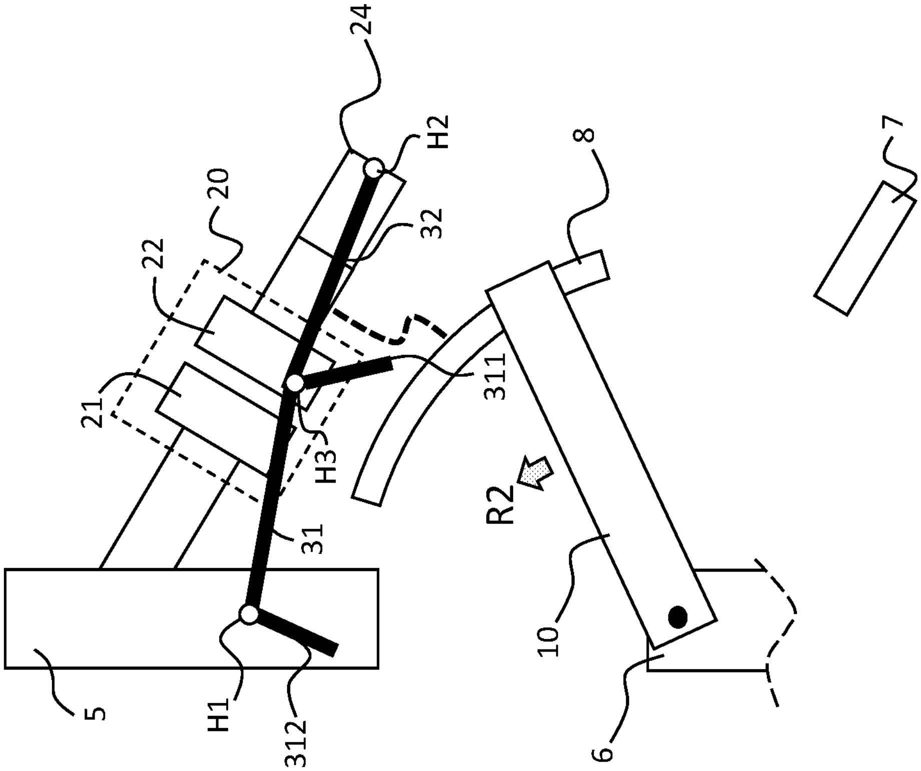
Figure 6:
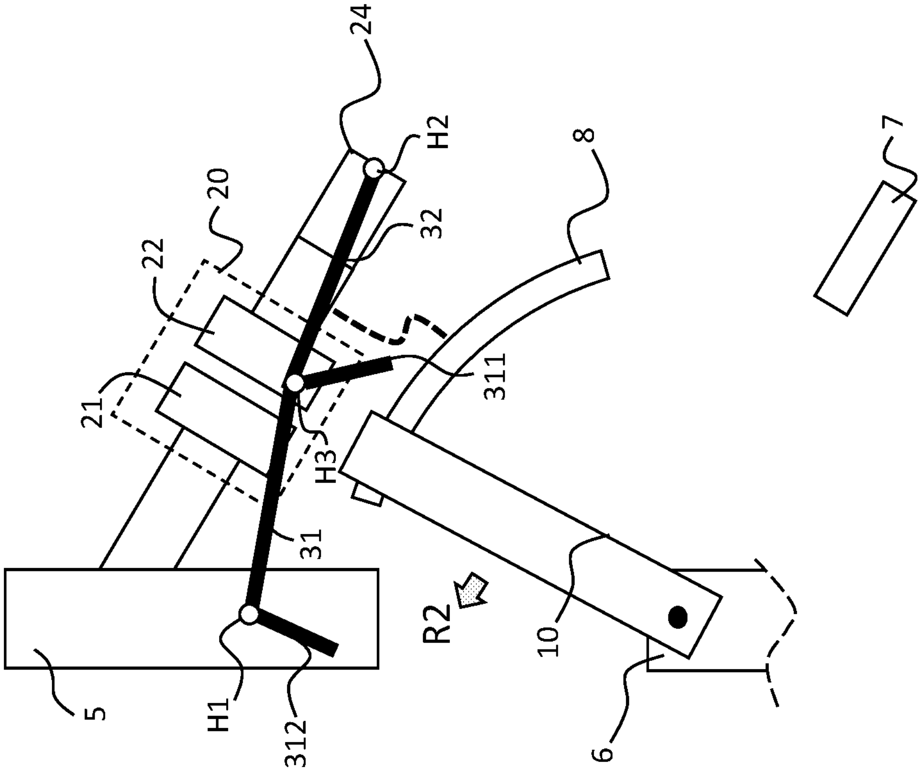
Figure 7:
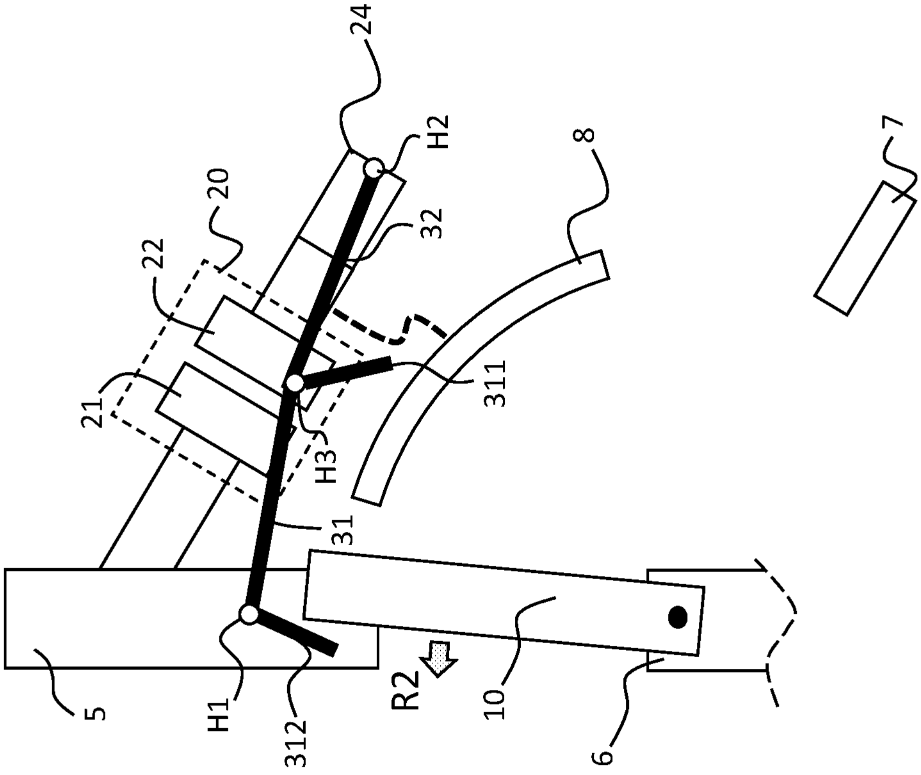

During a closing maneuver of the switching apparatus, the movable contact 10 moves, according to the second rotation direction R2, between the intermediate position $P_B$ and the first end-of-run position $P_A$. The movable contact 10 thus moves towards the corresponding first fixed contact 5 (FIGS. 5 and 12).

Upon an initial movement according to the second rotation direction R2, the movable contact 10 couples with the fourth fixed contact 8 (at the first contact portion 10A), thereby electrically connecting the fourth fixed contact 8 with the second fixed contact 6.

If the switching apparatus is of the "single-disconnection" type, the movable contact 10 is already coupled to the second fixed contact 6.

If the switching apparatus is of the "double-disconnection" type, the movable contact 10 couples also to the second fixed contact 6.

At this stage of the closing maneuver, the movable contact 10 does not interact with the motion transmission mechanism 30 as this latter is still in the second configuration C2 (FIGS. 6 and 14) and the first lever portion 311 of the first lever element 31 is not positioned along the motion trajectory of the movable contact 10. The motion transmission mechanism thus maintains the second configuration C2 and the movable arc contact 21 remains decoupled from the fixed arc contact 21.

Upon a further movement according to the second rotation direction R2, the movable contact 10 couples to the first fixed contact 5 (at the movable contact portion 10A) while remaining coupled to the second fixed contact 6. In this way, the movable contact 10 electrically connects the first fixed contact 5 with the second fixed contact 6.

The first and fourth fixed contacts 5 and 8 are mutually positioned so that the movable contact 10 couples with the first fixed contact 5 before decoupling from the fourth fixed contact 8.

In this transitory situation, both the first fixed contact 5 and the fourth fixed contact 8 are electrically connected with the second fixed contact 6.

When it finally decouples from the fourth fixed contact 8, the movable contact 10 electrically disconnects the fourth fixed contact 8 from the second fixed contact 6.

The movable contact 10 couples to the second lever portion 312 and it actuates the first lever element 31 while remaining coupled to the first fixed contact 5 (FIGS. 7 and 15) and to the second fixed contact 6.

The actuation of the first lever element 31 by the movable contact 10 causes a transition of the motion transmission mechanism 30 from the second configuration C2 to the first configuration C1 and a consequent movement D4 of the movable arc contact 22 from the uncoupled position P4 from the fixed arc contact 21 to the coupled position P3 with the fixed arc contact 21.

The movable contact 10 then reaches the first end-of-run position $P_A$, which corresponds to a closed state of the switching apparatus (FIGS. 1 and 9).

Disconnecting Maneuver

The switching apparatus 1 carries out a disconnecting maneuver, when it switches from an open state to a grounded state.

Obviously, before carrying out a disconnecting maneuver, the switching apparatus has to carry out an opening maneuver as described above in order to switch in an open state.

During a disconnecting maneuver of the switching apparatus, the movable contact 10 moves, according to the first rotation direction R1, between the intermediate position $P_B$ and the second end-of-run position $P_C$.

If the switching apparatus is of the "single-disconnection" type, the movable contact 10 couples with the third fixed contact 7 at the first movable contact portion 10A, when it reaches the second end-of-run position $P_C$, while it has the second movable contact portion 10B already coupled to the second fixed contact 6.

If the switching apparatus is of the "double-disconnection" type, the movable contact 10 couples also to the second fixed contact 6 at the first movable contact portion 10A and it couples with the third fixed contact 7 at the second movable contact portion 10B.

In any case, the movable contact 10 electrically connects the second pole terminal 12 with the ground terminal 13. The second pole terminal 12 is therefore put at a ground voltage.

It is evidenced that the motion transmission mechanism 30 remains in the second configuration C2 when the switching apparatus carries out a disconnecting maneuver. The movable arc contact 21 thus remains decoupled from the fixed arc contact 21.

Reconnecting Maneuver

The switching apparatus 1 carries out a reconnecting maneuver, when it switches from a grounded state to an open state.

During a reconnecting maneuver of the switching apparatus, the movable contact 10 moves, according to the second rotation direction R2, between the second end-of-run position $P_C$ and the intermediate position $P_B$.

In this way, the movable contact 10 decouples from the third fixed contact 7.

If the switching apparatus is of the "single-disconnection" type, the movable contact 10 remains coupled to the second fixed contact 6.

If the switching apparatus is of the "double-disconnection" type, the movable contact 10 decouples also from the second fixed contact 6.

In any case, the movable contact 10 electrically disconnects the third fixed contact 7 from the second fixed contact 6.

The movable contact 10 does not electrically connect the second pole terminal 12 with the ground terminal 13 anymore. The second pole terminal 12 results therefore at a floating voltage.

It is evidenced that the motion transmission mechanism 30 remains in the second configuration C2, when the switching apparatus carries out a reconnecting maneuver. The movable arc contact 21 thus remains decoupled from the fixed arc contact 21.

The switching apparatus, according to the present disclosure, provides remarkable advantages with respect to the known apparatuses of the state of the art.

The switching apparatus of the present disclosure includes, for each electric pole, a bistable motion transmission mechanism 30, which allows the movable contact 10 to drive the separation of the movable arc contact 22 from the fixed arc contact 21 depending on the position reached during an opening maneuver of the switching apparatus.

In this way, the breaking process of the current flowing along each electric pole can be made to occur at level of the arc contacts 21, 22 accommodated in the vacuum chamber 23. Possible electric arcs, which derive from the interruption of a current flowing along each electric pole, therefore form in a vacuum atmosphere only, which allows improving their quenching process.

As the motion transmission mechanism 30 can stably take two different configurations, an improved synchronization between the movements of the movable arc contact 22 and the movable contact 10, during an opening or closing maneuver of the switching apparatus, can be obtained.

The circumstance that the motion transmission mechanism 30 can be actuated at different spaced lever portions 311, 312 allows further improving the synchronization between the movement of the movable arc contact 22 and the movement of the movable contact 10.

As illustrated above, during a closing maneuver of the switching apparatus, the movable contact 10 reaches the first fixed contact 5 before engaging the motion transmission mechanism 30 to cause the movable arc contact 22 to couple with the fixed arc contact 21. In this way, during a closing maneuver, the vacuum interrupter 20 does not have to carry a possible short circuit current or an overload current or, more simply, a nominal current. This solution is quite advantageous as it allows designing a more compact vacuum chamber 23, which allows obtaining a size and cost reduction for the overall switching apparatus.

The switching apparatus of the present disclosure has electric poles with a very compact, simple and robust structure with relevant benefits in terms of size optimization.

The switching apparatus, according to the present disclosure, ensures high-level performances in terms of dielectric insulation and arc-quenching capabilities during the current breaking process and, at the same time, it is characterized by high levels of reliability for the intended applications.

The switching apparatus, according to the present disclosure, is of relatively easy and cheap industrial production and installation in the field.

The invention claimed is:

1. A switching apparatus for medium voltage electric systems, said switching apparatus comprising one or more electric poles, wherein, for each electric pole, said switching apparatus comprises:

- a first pole terminal, a second pole terminal and a ground terminal, said first pole terminal electrically couplable with a first conductor of an electric line, said second pole terminal electrically couplable to a second conductor of said electric line, and said ground terminal electrically couplable to a grounding conductor;
- a plurality of fixed contacts spaced apart one from another, said plurality of fixed contacts comprising a first fixed contact electrically connected to said first pole terminal, a second fixed contact electrically connected to said second pole terminal, a third fixed contact electrically connected to said ground terminal, and a fourth fixed contact;

a movable contact reversibly movable about a corresponding rotation axis according to opposite first and second rotation directions, so that said movable contact can be coupled to or uncoupled from said fixed contacts;

a vacuum interrupter comprising a fixed arc contact electrically connected to said first pole terminal, a movable arc contact electrically connected to said fourth fixed contact and reversibly movable along a corresponding translation axis between a coupled position with said fixed arc contact and an uncoupled position from said fixed arc contact, and a vacuum chamber, in which said fixed arc contact and said movable arc contact are enclosed and can be coupled or decoupled; and a motion transmission mechanism operatively coupled to said movable arc contact, said motion transmission mechanism actuatable by said movable contact to cause a movement of said movable arc contact along said translation axis, when said movable contact moves about said rotation axis, wherein said motion transmission mechanism comprises a first lever element pivoted on a fixed support at a first hinge point and a second lever element pivoted on a said movable arc contact at a second hinge point, said first and second lever elements pivoted one on another at a third hinge point.

2. The switching apparatus according to claim 1, wherein said motion transmission mechanism is configured to take a first configuration, at which said third hinge point is in a first position and said movable arc contact is in said coupled position, and a second configuration, at which said third hinge point is in a second position, spaced apart from said first position, and said movable arc contact is in said uncoupled position, wherein said motion transmission mechanism is configured to maintain stably said first configuration or said second configuration, if said motion transmission mechanism is not actuated by said movable contact, and wherein said motion transmission mechanism is configured to change configuration, if said motion transmission mechanism is actuated by said movable contact.

3. The switching apparatus according to claim 2, wherein said motion transmission mechanism is configured to switch from said first configuration to said second configuration upon an actuation by said movable contact, when said movable contact moves according to said first rotation direction and electrically connects said fourth fixed contact to said second fixed contact, a transition of said motion transmission mechanism from said first configuration to said second configuration causing a movement of said movable arc contact from said coupled position to said uncoupled position.

4. The switching apparatus according to claim 2, wherein said motion transmission mechanism is configured to switch from said second configuration to said first configuration upon an actuation by said movable contact, when said movable contact moves according to said second rotation direction and electrically connects said first fixed contact to said second fixed contact, a transition of said motion transmission mechanism from said second configuration to said first configuration causing a movement of said movable arc contact from said uncoupled position to said coupled position.

5. The switching apparatus according to claim 2, wherein said motion transmission mechanism is configured to switch from said first configuration to said second configuration or from said second configuration to said first configuration, upon an actuation of said first lever element by said movable contact.

6. The switching apparatus according to claim 5, wherein said first lever element comprises a first lever portion and a second lever portion, which are spaced apart one from another, wherein said motion transmission mechanism is configured to switch from said first configuration to said second configuration, upon an actuation of said first lever portion by said movable contact, and wherein said motion transmission mechanism is configured to switch from said second configuration to said first configuration, upon an actuation of said second lever portion by said movable contact.

7. The switching apparatus according to claim 2, wherein the movable contact of each electric pole is reversibly movable between a first end-of-run position, which corresponds to a closed state of said switching apparatus, and a second end-of-run position, which corresponds to a grounded state of said switching apparatus, said movable contact passing through an intermediate position, which corresponds to an open state of said switching apparatus, when moving between said first and second end-of-run positions.

8. The switching apparatus according to claim 7, wherein, during an opening maneuver of said switching apparatus, said movable contact moves according to said first rotation direction away from said first end-of-run position and towards said intermediate position, and wherein, upon an initial movement according to said first rotation direction, said movable contact decouples from said first fixed contact and couples with said fourth fixed contact, thereby electrically disconnecting said first fixed contact from said second fixed contact and electrically connecting said fourth fixed contact with said second fixed contact.

9. The switching apparatus according to claim 8, wherein said movable contact actuates said motion transmission mechanism while said movable contact is slidingly coupled to said fourth fixed contact and electrically connects said fourth fixed contact to said second fixed contact, the actuation by said movable contact causing a transition of said motion transmission mechanism from said first configuration to said second configuration and a consequent movement of said movable arc contact from said coupled position to said uncoupled position.

10. The switching apparatus according to claim 9, wherein, upon a further movement according to said first rotation direction, said movable contact decouples from said motion transmission mechanism and from said fourth fixed contact and subsequently reaches said intermediate position, thereby electrically disconnecting said fourth fixed contact from said second fixed contact.

11. The switching apparatus according to claim 7, wherein, during a closing maneuver of said switching apparatus, said movable contact moves according to said second rotation direction away from said intermediate position and towards said first end-of-run position, and wherein, upon an initial movement according to said second rotation direction, said movable contact couples with said fourth fixed contact, thereby electrically connecting said fourth fixed contact with said second fixed contact.

12. The switching apparatus according to claim 11, wherein, upon a further movement according to said second rotation direction, said movable contact decouples from said fourth fixed contact and couples with said first fixed contact, thereby electrically disconnecting said fourth fixed contact from said second fixed contact and electrically connecting said first fixed contact with said second fixed contact.

13. The switching apparatus according to claim 12, wherein, upon a further movement according to said second rotation direction, said movable contact actuates said motion transmission mechanism while said movable contact is slidingly coupled to said first fixed contact and electrically connects said first fixed contact to said second fixed contact, the actuation by said movable contact causing a transition of said motion transmission mechanism from said second configuration to said first configuration and a consequent movement of said movable arc contact from said uncoupled position to said coupled position.

14. The switching apparatus according to claim 13, wherein, upon a further movement according to said second rotation direction, said movable contact decouples from said motion transmission mechanism and subsequently reaches said first end-of-run position, while remaining slidingly coupled to said first fixed contact and electrically connecting said first fixed contact to said second fixed contact.

15. The switching apparatus according to claim 1, wherein said movable contact of each electric pole comprises a conductive body having a first movable contact portion that can be coupled to or uncoupled from said first, third and fourth fixed contacts and a second movable contact portion that is electrically connected with said second fixed contact.

16. The switching apparatus according to claim 1, wherein said movable contact of each electric pole comprises a conductive body having a first movable contact portion that can be coupled to or uncoupled from said first, second and fourth fixed contacts and a second movable contact portion that can be coupled to or uncoupled from said second and third fixed contacts.

17. The switching apparatus according to claim 1, wherein the switching apparatus is a load-break switch for medium voltage electric systems.

* * * * *